United States Patent [19]

Moriyama

[11] Patent Number: 5,543,973
[45] Date of Patent: Aug. 6, 1996

[54] MAGNETIC FIELD GENERATING APPARATUS FOR GENERATING BIAS MAGNETIC FIELD IN A MAGNETIC INFORMATION TRANSFER SYSTEM

[75] Inventor: Masaru Moriyama, Yokosuka, Japan

[73] Assignee: Victor Company of Japan, Ltd., Yokohama, Japan

[21] Appl. No.: 132,647

[22] Filed: Oct. 6, 1993

[30] Foreign Application Priority Data

| Oct. 6, 1992 | [JP] | Japan | 4-292136 |
| Oct. 9, 1992 | [JP] | Japan | 4-298023 |
| Jun. 7, 1993 | [JP] | Japan | 4-163232 |

[51] Int. Cl.$^6$ .................................................. G11B 5/86
[52] U.S. Cl. ........................ 360/17; 360/31; 360/109
[58] Field of Search ...................... 360/17, 110, 125, 360/107, 122, 16, 129, 31, 109; 324/253

[56] References Cited

U.S. PATENT DOCUMENTS

| 3,860,957 | 1/1975 | Imanishi et al. | 360/17 |
| 4,819,102 | 4/1989 | Shirai et al. | 360/17 |
| 4,933,637 | 6/1990 | Veda et al. | 324/253 |

FOREIGN PATENT DOCUMENTS

| 44-28457 | 11/1969 | Japan . |
| 63-44214 | 3/1988 | Japan . |
| 1181112 | 12/1989 | Japan . |
| 02083825 | 3/1990 | Japan . |
| 02310824 | 12/1990 | Japan . |
| 0317830 | 1/1991 | Japan . |

*Primary Examiner*—Andrew L. Sniezek
*Attorney, Agent, or Firm*—Michael N. Meller

[57] ABSTRACT

A magnetic field generating apparatus for generating a biasing magnetic field applied to master and slave tapes superposed each other for transferring information signals recorded on the master tape to the slave tape, the apparatus comprises a rotary cylinder having a high magnetic permeability on its surface, a main magnetic pole disposed to confront the rotary cylinder for projecting the biasing magnetic field toward the rotary cylinder through a gap defined by a first predetermined distance, a sub-magnetic pole magnetically connected to the main magnetic pole, the master and the slave tapes are depressed to the rotary cylinder by compressed air, and an exciting source for exciting the main magnetic pole to generate the biasing magnetic field, wherein the sub-magnetic pole comprises at least one side-core disposed at a side of the main magnetic pole a second predetermined distance apart therefrom, the side-core confronts with and extends along the rotary cylinder, the second predetermined distance is substantially larger than the first predetermined distance, and a confronting area of the side-core facing to the rotary cylinder is substantially larger than a confronting area of the main magnetic pole facing to the rotary cylinder. An angle of the line of uniform flux density zone formed in front of the main magnetic pole with respect to a rotation axis of the rotary cylinder, can electrically be controlled by making the main magnetic pole being bifurcated to have two legs and exciting them differently each other.

3 Claims, 20 Drawing Sheets

MAGNETIC FIELD GENERATING APPARATUS FOR GENERATING BIAS MAGNETIC FIELD IN A MAGNETIC INFORMATION TRANSFER SYSTEM

BACKGROUND OF THE INVENTION

1. Field of the Invention

The present invention relates to a magnetic information transfer apparatus for transferring a magnetically recorded information on a master magnetic recording medium to a slave magnetic recording medium.

2. Description of the Prior Art

As a magnetic information transfer apparatus for transferring a magnetic recording information recorded on a master magnetic recording medium (referred to as "master tape" hereinafter) to another magnetic recording medium having no information recorded (referred to as "slave tape" hereinafter), thermal transfer type and magnetic field transfer type systems have been proposed. Among others, the magnetic field transfer type apparatus, in which a master tape and a slave tape are passed through a bias magnetic field for information transfer in a direction orthogonal to the bias magnetic field, with magnetic surfaces thereof being in an intimate contact with each other, to transfer the magnetic information on the master tape to the slave tape, is advantageous compared with a case where a copy tape is obtained according to the so-called 1:1 dubbing system in that it is possible to obtain a copy tape at higher speed.

FIG. 1 shows an example of a bias magnetic field generator of a conventional magnetic field transfer type apparatus. In FIG. 1, a reference numeral 1 depicts a main head base, 2 a sub-head base, 3 a head holder and 4 a magnetic head for generating a bias magnetic field to be used to transfer a magnetic information. The magnetic head 4 takes in the form of the so-called C type head having a magnetic gap 4a. A reference numeral 5 depicts a drum of soft magnetic material which is rotated by a rotary shaft 6.

The magnetic head 4 is provided on a structural portion including the main head base 1 and the sub-head base 2 such that the magnetic gap 4a thereof is positioned with respect to an outer peripheral surface of the drum 5 with a minute distance thereto. Side face portions 1a and 2a of the main and sub head bases 1 and 2 are faced to the outer peripheral surface of the drum 5 with minute distances with respect thereto.

A master tape 7 and a slave tape 8 having magnetic surfaces in intimate contact with each other are held in pressure contact with the outer peripheral surface of the drum 5 by air jetted from orifices provided in the main and sub head bases 1 and 2 and run along with rotation of the drum while being subjected to magnetic flux extending from the magnetic gap 4a of the magnetic head 4 toward the drum 5.

When the drum 5 is not positioned in the vicinity of the magnetic gap 4a of the head 4, a horizontal component of magnetic flux leakage from the magnetic gap 4a becomes major and, when the drum 5 is arranged in proximity to the magnetic gap 4a, a vertical component of the magnetic flux leakage from the gap 4a becomes major.

FIG. 2 is a graph showing a leakage magnetic field distribution in the magnetic gap 4a of the magnetic head 4 shown in FIG. 1, which is obtained by a model experiment. As is clear from FIG. 2, a vertical component Hy (Hy') of the magnetic field leakage in the gap 4a becomes symmetrical about a center line of the gap 4a with peaks being on both sides of the center line of the gap.

In the magnetic field strength distribution shown in FIG. 2, a portion thereof which is inherently necessary as a bias magnetic field for transferring an information recorded on the master tape to the slave tape is only a descending slope portion of the right side peak thereof. The left side distribution is an unnecessary portion and the left side peak portion may contribute to demagnetization of the master tape 7 during it passes therethrough.

In the field distribution shown in FIG. 2, the vertical magnetic field strength curve Hy and the horizontal magnetic field strength curve Hx shown by solid lines are obtained when nozzle members NB1 and NB2 provided in the vicinity of the magnetic had 4 for jetting air to pressure-contact the master tape 7 and the slave tape 8 with the outer peripheral surface of the drum 5 are of non-magnetic and electrically non-conductive material such as ceramics. The vertical magnetic field strength curve Hy' and the horizontal magnetic field strength curve Hx' shown by dotted lines are obtained when the nozzle member NB1 provided on the left side of the head 4 is of non-magnetic and electrically non-conductive material and the right side nozzle member NB2 is of non-magnetic and electrically conductive material such as aluminum alloy or stainless steel, etc.

In the distribution curves shown in FIG. 2, the descending portion of the right side peak of the vertical magnetic strength curves Hy' is steeper than that of the curve Hy and the descending portion of the horizontal curve Hx' is also steeper than that of the curve Hx. This is because that a reverse magnetic field which cancels magnetic line of force passed through the metal nozzle members provided in the vicinity of the magnetic head 4 is generated with which eddy current flows through the metal nozzles to reduce magnetic field strength in the skirt portions of the descending portions on the right side of the center of the gap 4a.

When the slope of the skirt portion of the right side portion of the magnetic field strength curve becomes steep, a region which is subjected to the bias magnetic field becomes narrow. Therefore, a magnetic transfer region in which the master tape 7 and the slave tape 8 are in pressure-contact with the outer peripheral surface of the drum 5 without vibration by means of air jetted from the nozzles becomes narrow advantageously. However, it is necessary to set frequency of current for generating the bias magnetic field at high value such that the bias magnetic field alternates a predetermined number of times or more within such narrow transfer region.

In the structure in which the metal nozzle members are arranged in the vicinity of the magnetic head 4, eddy current flows in the metal nozzle member as mentioned previously and the slope of the skirt of the descending portion of the right side peak of the magnetic field strength distribution with respect to the center line of the magnetic gap 4a of the head 4 becomes steep. However, the efficiency of the bias magnetic field generator is necessarily lowered due to such eddy current. Further, due to increase of magnetic core loss caused by the use of high frequency current, heat generation becomes considerable. In addition, due to high frequency current, a drive circuit therefor becomes expensive.

For the drum 5 of soft magnetic material which is rotated by the rotary shaft 6 driven by driving power transmitted from a power source, not shown, it rotates with some eccentricity dependent on manufacturing preciseness of bearings supporting the drum and circularity of the drum, etc., and the bias magnetic field varies with variation of distance between the magnetic head and the outer peripheral surface of the drum due to the eccentric rotation of the drum. Thus, it is difficult to obtain a cop tape of acceptable quality.

Further, in the bias magnetic field generator shown in FIG. 1, passage for compressed air is provided in a side surface of the C shaped magnetic head. Since, in order to pressure-contact the master tape and the slave tape with the relatively wide outer peripheral surface of the drum in view of magnetic saturation of the core, a large amount of compressed air is necessary.

SUMMARY OF THE INVENTION

The present invention provides a bias magnetic field generator for use in a magnetic information transfer system in which an information recorded on a master magnetic recording medium is transferred onto a slave magnetic recording medium having a magnetic surface in intimate contact with a magnetic surface of the master magnetic recording medium by applying a bias magnetic field to a region of the the recording media which is made in pressure-contact with a rotary magnetic cylinder member in a thickness direction of the recording media. The bias magnetic field generator comprises a main magnetic pole provided in a plane in the vicinity of a surface of the pressure-contact region of the magnetic recording media having the other surface in pressure-contact with the outer peripheral surface of the rotary magnetic cylinder member having at least an outer peripheral surface portion of high permeability magnetic material, the main magnetic pole being wide enough to cover a width of the magnetic recording media completely and having a tapered top end portion faced to the surface of the pressure-contact region of the magnetic recording media, and a magnetic core member having a surface in proximity to the outer peripheral surface of the rotary magnetic cylinder member, the surface of the magnetic core member extending in the direction of the outer peripheral surface of the rotary magnetic cylinder member by a distance substantially larger than a minimum distance between the top end portion of the main magnetic pole and the outer peripheral surface of the rotary magnetic cylinder member in both sides of the top end portion of the main magnetic pole. The bias magnetic field generator may further comprise a magnetic flux detection coil provided in the vicinity of the top end portion of the main magnetic pole for detecting flux of the main magnetic pole, a closed automatic control circuit for automatically controlling amplitude of a bias current such that a value of an output signal from the flux detection coil becomes a reference value to thereby make the bias magnetic field strength constant.

The master magnetic recording medium and the slave magnetic recording medium having magnetic surfaces faced each other are made in pressure-contact with the outer peripheral surface of the rotary magnetic cylinder member at least the surface portion of which is of high permeability material.

A bias magnetic field alternating at a predetermined frequency is generated in a space between the main magnetic pole which is wide enough to cover the width of the magnetic recording media completely and has the tapered top end portion faced to the surface of the pressure-contact region of the magnetic recording media and the outer peripheral surface of the rotary magnetic cylinder member at least the surface portion of which is of high permeability magnetic material.

A magnetic flux return path is formed between a core member having a surface in proximity to the outer peripheral surface of the rotary magnetic cylinder member, the surface of the magnetic core member extending in a direction of the outer peripheral surface of the rotary magnetic cylinder member by a distance substantially larger than the minimum distance between the tapered top end portion of the main magnetic pole and the outer peripheral surface of the rotary magnetic cylinder member.

The bias magnetic field strength is made constant by automatically controlling, by means of the closed automatic control circuit, the amplitude of the bias current such that the output signal from the flux detection coil provided in the vicinity of the tapered top end portion of the main magnetic pole for detecting flux in the main magnetic pole becomes a predetermined reference value.

DETAILED DESCRIPTION OF THE PREFERRED EMBODIMENTS

Figure 3:
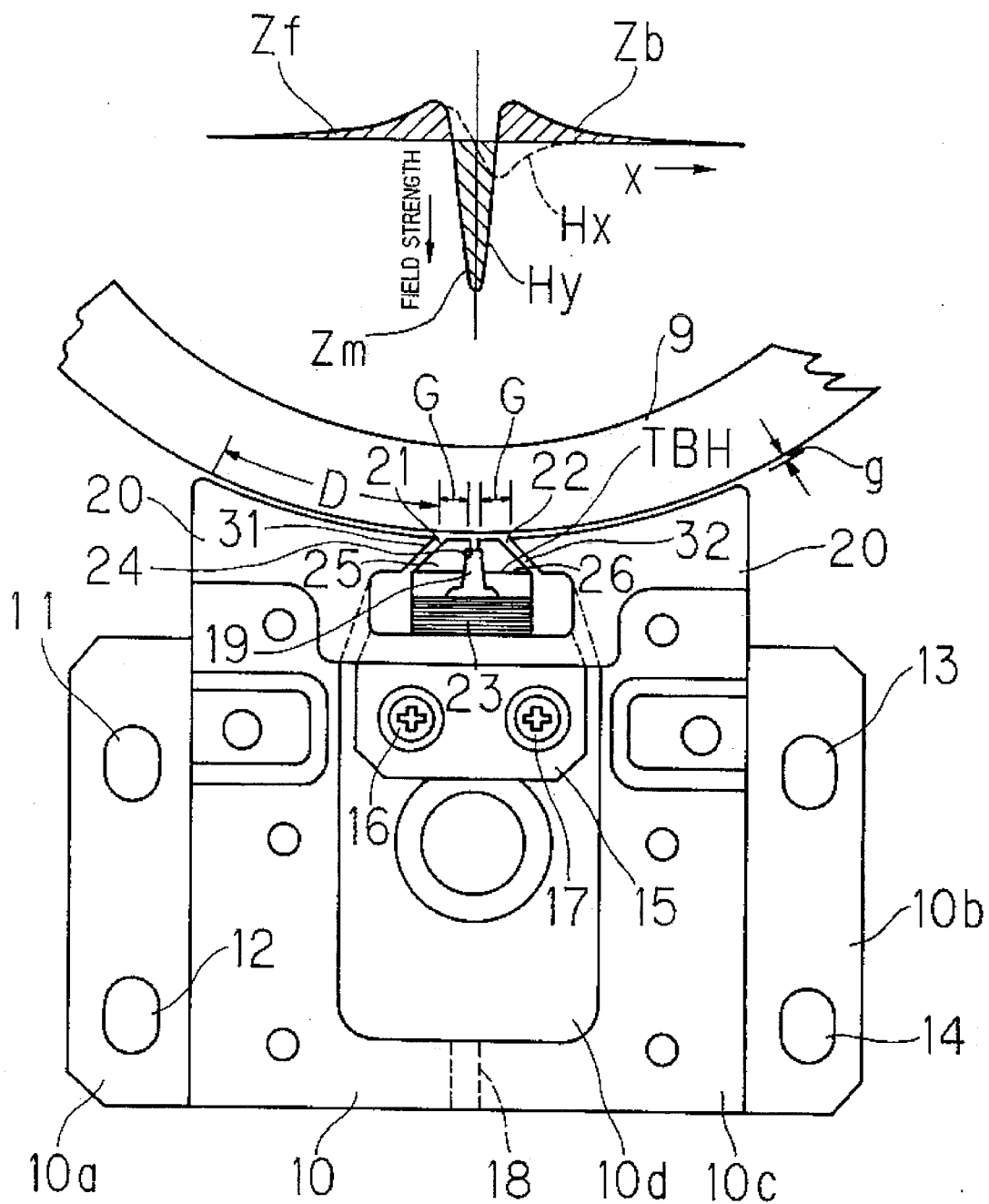
FIG. 3 is a plan view of a portion of a bias field generator according to a first embodiment of the present invention.
Figure 4:
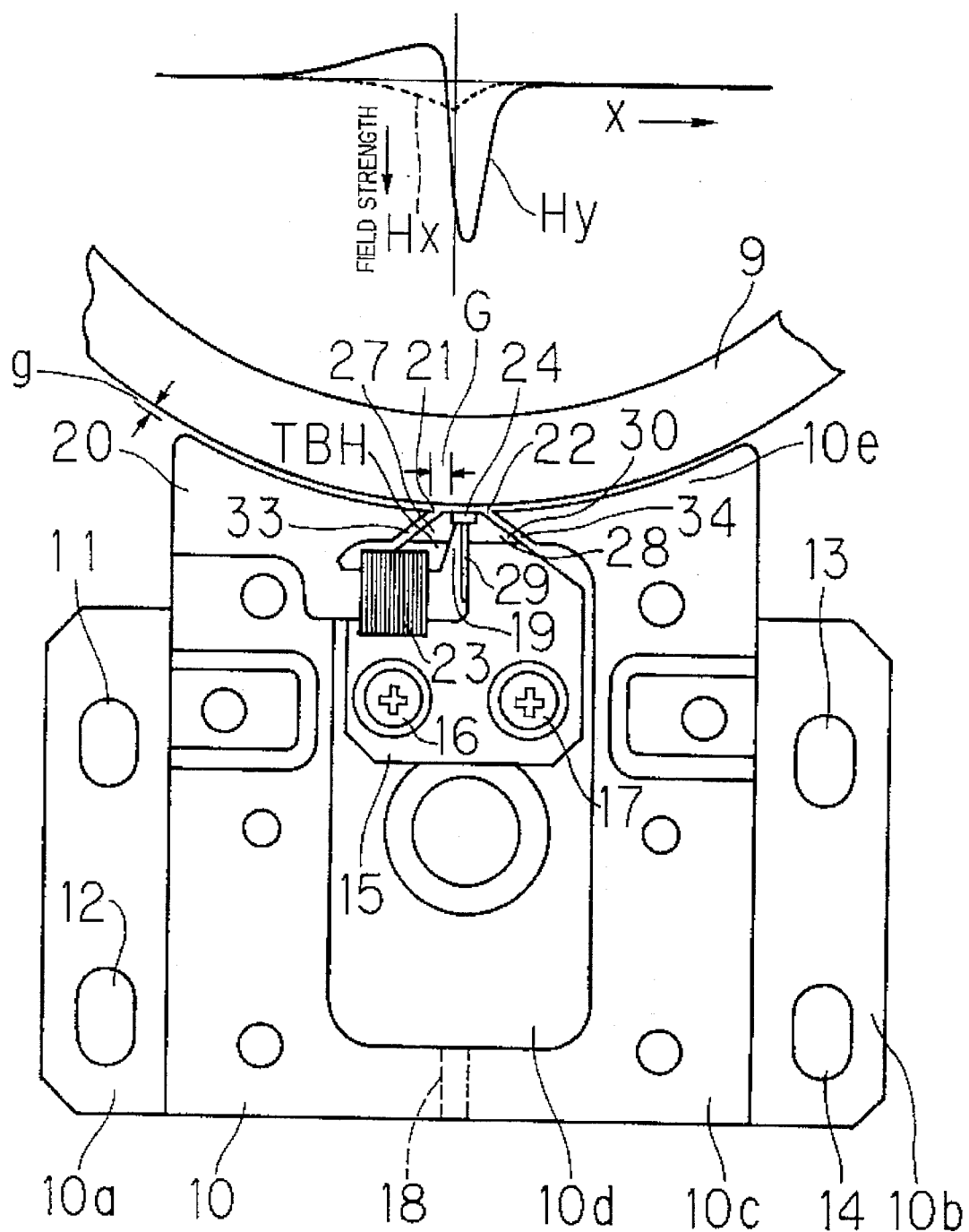
FIG. 4 is a plan view of a portion of a bias field generator according to a second embodiment of the present invention.
Figure 5:
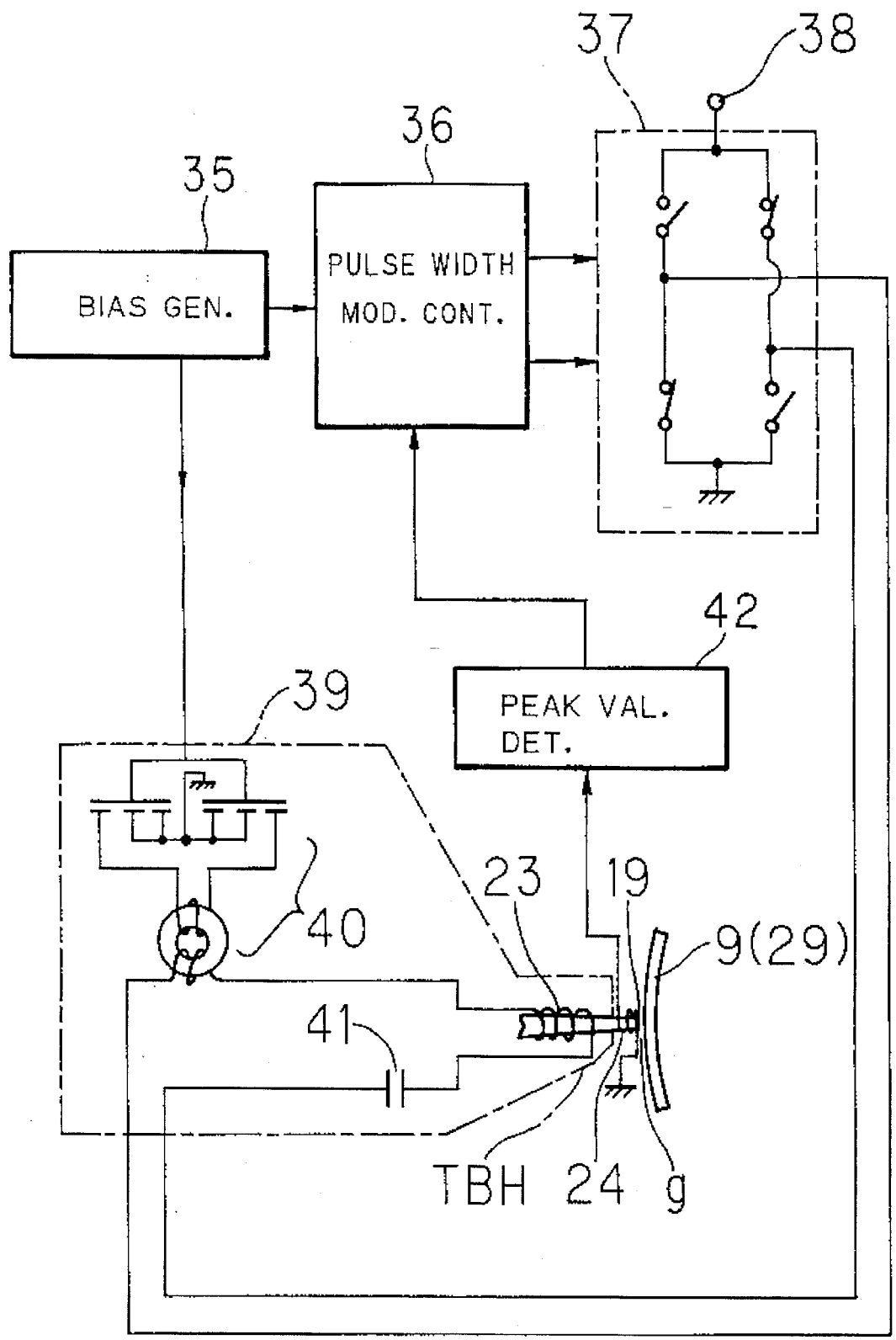
FIG. 5 is a block circuit diagram of bias current supply circuit for the present invention.

A bias magnetic field generator in a magnetic information transfer system according to the present invention will be described in detail with reference to the drawings. FIGS. 3 and 4 are plan views showing a portion of the bias magnetic field generator according to different embodiments of the present invention, respectively, and FIG. 5 is a block diagram of a bias current supply circuit thereof.

In FIGS. 3 and 4, a reference numeral 9 depicts a rotary magnetic cylinder member at least an outer peripheral portion of which is made of high permeability material. The rotary magnetic cylinder member 9 may be provided as an annular drum of sintered ferrite particles sintered under pressure. A reference numeral 10 depicts a head block mounting member which is fixedly secured to a predetermined mounting portion of the transfer system through a mounting piece 10a formed with holes 11 and 12 and a mounting piece 10b formed with holes 13 and 14. The head block mounting member 10 is formed with a recess 10d to which a mounting member 15 for a bias magnetic field generating head is fixedly secured by screws 16 and 17. A main magnetic pole 19 which constitutes, together with a core member 20 to be described, a bias magnetic field generating head TBH.

The recess 10d of the head block mounting member 10 forms a pressurized-air chamber when closed by fixedly securing a cover member (not shown) to an upper face 10c of the head block mounting member 10. Pressurized-air is supplied to the pressurized-air chamber through an inlet hole 18 formed in a rear wall of the head block mounting member 10. Pressurized-air supplied to the pressurized-air chamber formed by the recess 10d is jetted from jet holes 21 and 22 provided in the vicinity of the main magnetic pole 19 of the bias magnetic field generating head TBH.

Pressurized-air jetted from the jet holes 21 and 22 presses a master magnetic recording medium having information recorded and a non-recorded slave magnetic recording medium which is overlapped with the master recording medium with magnetic surfaces thereof being faced each other to a portion of the outer peripheral surface of the rotary magnetic cylinder member 9. In the vicinity of the outer peripheral surface portion of the rotary magnetic cylinder member, a top end portion of the main magnetic pole 19 is arranged.

The bias magnetic field generating head TBH mounted on the head block mounting member 15 may have a construction shown in FIG. 3 in which the core members 20 are arranged in both sides of the main magnetic pole 19 in a common plane or a construction shown in FIG. 4 which shows a second embodiment of the present invention where the core members 20 are arranged in both sides of the main magnetic pole 20 in different planes. In any case, it is enough that the bias magnetic field generating head TBH comprises the main magnetic pole 19 provided in a plane in the vicinity of a surface of the pressure-contact region of the magnetic recording media having the other surface in pressure-contact with an outer peripheral surface of the rotary magnetic cylinder member 9 having at least the outer peripheral surface portion of high permeability material, the main magnetic pole being wide enough to cover a width of the magnetic recording media completely and having a tapered top end portion faced to the surface of the pressure-contact region of the magnetic recording media, and the magnetic core members 20 having surfaces in proximity to the outer peripheral surface of the rotary magnetic cylinder member 9, the surfaces of the magnetic core members 20 extending in the direction of the outer peripheral surface of the rotary magnetic cylinder member 9 with a distance G apart from the the main magnetic pole 19, which is substantially i.e., at least 20 times larger than a minimum distance g between the tapered top end portion of the main magnetic pole 19 and the outer peripheral surface of the rotary magnetic cylinder member 9.

An exciting coil 23 is wound on a magnetic path between the main magnetic pole 19 and the magnetic core member 20 of the bias magnetic field generating head TBH shown in FIGS. 3 or 4 to which a bias current of a predetermined frequency is supplied from a bias current supply circuit to be described with reference to FIG. 5. Further, a flux detecting coil 24 is provided in the vicinity of the top end portion of the main magnetic pole 19 for detecting magnetic flux in the main magnetic pole 19. An output signal of the flux detecting coil 24 is used in a closed automatic control circuit for automatically controlling a magnitude of the bias current such that it becomes a predetermined reference value, as to be described later.

In the bias magnetic field generating head TBH shown in FIG. 3, block members 25 and 26 of non-magnetic material are provided between the main magnetic pole 19 and the magnetic core members 20 and air passages 31 and 32 for communicating the jet holes 21 and 22 with the pressurized-air chamber, that is, the recess 10d, are provided between the blocks 25 and 26 and the core members 20, respectively.

In the bias magnetic field generating head TBH shown in FIG. 4, a magnetic thin metal film 29 of high permeability is fixed to the top end portion of the main magnetic pole 19 and the block 27 of non-magnetic, electrically insulating material is provided between the main magnetic pole 19 and the core member 20. The air passage 33 is provided between the block member 27 and the core member 20 for communicating the jet hole 21 with the pressurized-air chamber 10d. Further, the block member 28 of non-magnetic, electrically insulating material is provided between the main magnetic pole 19 and a front end portion 10e of the head block mounting member 10 and the air passage 34 is provided between the block member 28 and the front end portion 10e for communicating the jet hole 22 with the pressurized-air chamber 10d. Further, a metal piece 30 is provided on a face of the block member 28 on the side of a passage 34.

The thin metal film 29 of high permeability provided in the vicinity of the top end portion of the main magnetic pole 19 prevents the main magnetic pole 19 having a narrow cross sectional area from being magnetically saturated. The metal piece 30 provided on the face of the block member 28 on the side of the passage 34 is of non-magnetic, electrically conductive material such as aluminum alloy or stainless steel so that magnetic flux of the field corresponding to the skirt portion of the descending slope of the magnetic field distribution characteristics curve penetrates the metal piece 30 to produce eddy current therein. Therefore, magnetic field generated by the eddy current, which is opposite in direction to the bias magnetic field applied, cancels the latter at least partially, resulting in reduction of the applied field portion corresponding to the skirt portion.

The front end portion 10e and the block member 28 are of non-magnetic, electrically insulating material. Therefore, it is possible to reduce magnetic field strength in only a necessary region of the descending slope in the magnetic field distribution by suitably selecting configuration and size of the metal piece 30 as well as a position in which the metal piece 30 is to be located, without generating unnecessary eddy current. Thus, a high efficiency transfer bias magnetic field generator is realized.

The bias magnetic field generating head TBH shown in FIGS. 3 or 4 includes the magnetic core member 20 disposed at a distance G apart from the main magnetic pole 19, and a surface of which extends further away from the main magnetic pole 19 with a distance D along the outer peripheral surface of the rotary magnetic cylinder member 9, thus the magnetic core member 20 having an extensive area (distance D×tape width) confronting the outer peripheral surface of the rotary magnetic cylinder member 9.

Experiments under exemplary conditions listed below, revealed that a value of the distance G is 1.5 mm or more preferably 2.25 mm, and a value of the distance D is 15 mm or more preferably 25 mm considering a space limitation around the head. Distance D is at least 200 times as large as the distance "g".

Coercivity of the slave tape: 680 Oe

Biasing field frequency: 150 kHz

Biasing field strength: 1150 to 1300 Oe vertical less than 50 Oe horizontal

Rotary drum: Ferrite drum of 100 mm dia.

It should be noted that the distance G is substantially larger than the minimum distance "g" between the tapered top end portion of the main magnetic pole and the outer peripheral surface of the rotary magnetic cylinder member 9 in either sides of the main magnetic pole 19 and there is provided the exciting coil 23 on the magnetic path between the main magnetic pole 19 and the core member 20. Therefore, when a bias current of predetermined frequency is supplied from the bias current supply circuit to the exciting coil 23, a closed magnetic circuit from a portion of the magnetic path on which the exciting coil 23 is mounted, through the main magnetic pole 19, the outer peripheral surface of the rotary magnetic cylinder member 9, the rotary magnetic cylinder member 9, a gap between the cylinder member 9 and the core member 20 to the magnetic path on which the exciting coil 23 is wound is established by magnetomotive force (ampere-turn) generated correspondingly to the supplied bias current.

A magnetic field whose vertical component Hy and horizontal component Hx shown by a solid line and a dotted line, respectively, in an upper portion of FIGS. 3 or 4 is generated in a gap portion between the main magnetic pole 19 and the outer peripheral surface of the rotary magnetic cylinder member 9 of the bias magnetic field generating head TBH.

From FIGS. 3 or 4, it is clear that the vertical component Hy which is larger than the horizontal component Hx has a single peak at the position of the main magnetic pole 19.

When the master magnetic recording medium and the slave magnetic recording medium pressed to the outer peripheral surface of the rotary magnetic cylinder member 9 by air jet from the jet holes 21 and 22, with the magnetic surfaces of the tapes being faced to each other, run with rotation of the cylinder member 9, the magnetic information recorded on the master magnetic recording medium is transferred to the slave magnetic recording medium when the magnetic recording media pass through the bias magnetic field corresponding to the single peak vertical component generated in the vicinity of the main magnetic pole 19 of the bias magnetic field generating head TBH.

Figure 1:
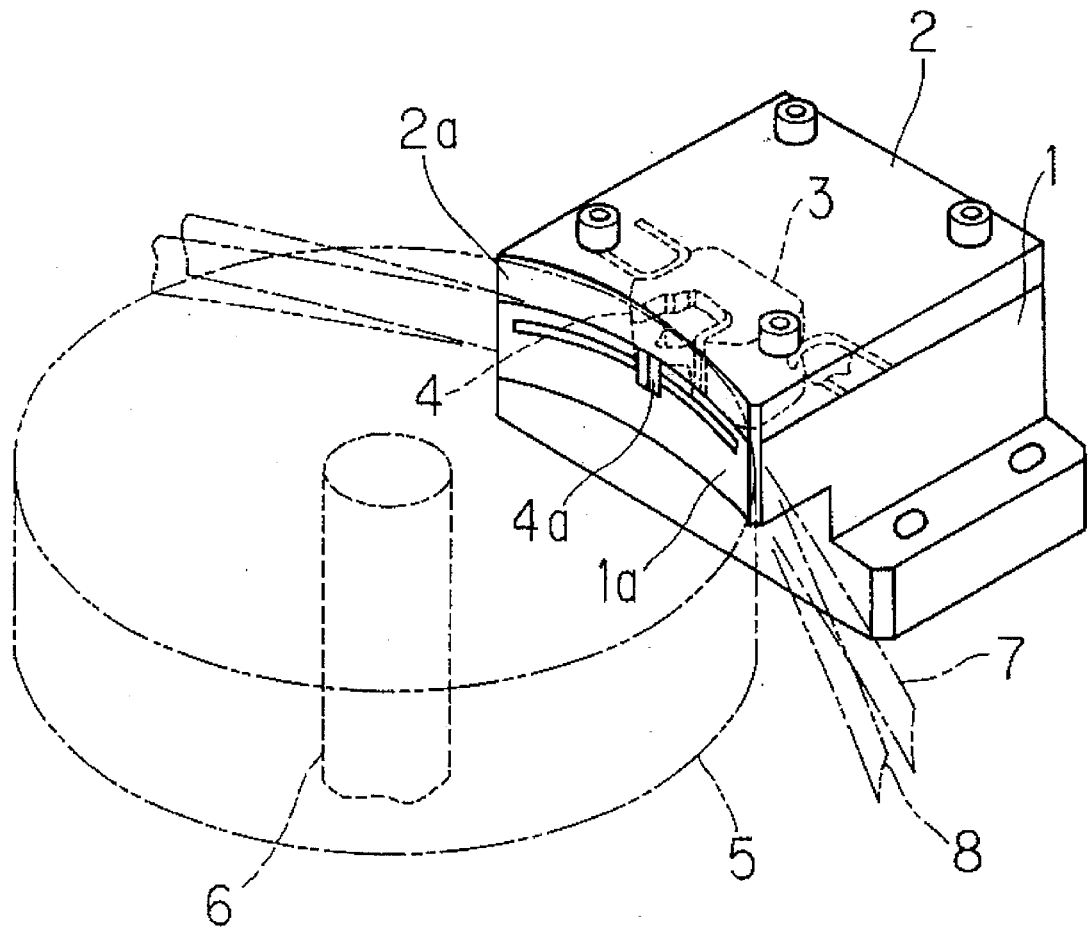
FIG. 1 is a perspective view of a conventional bias magnetic field generator to be used in a magnetic information recording apparatus.
Figure 2:
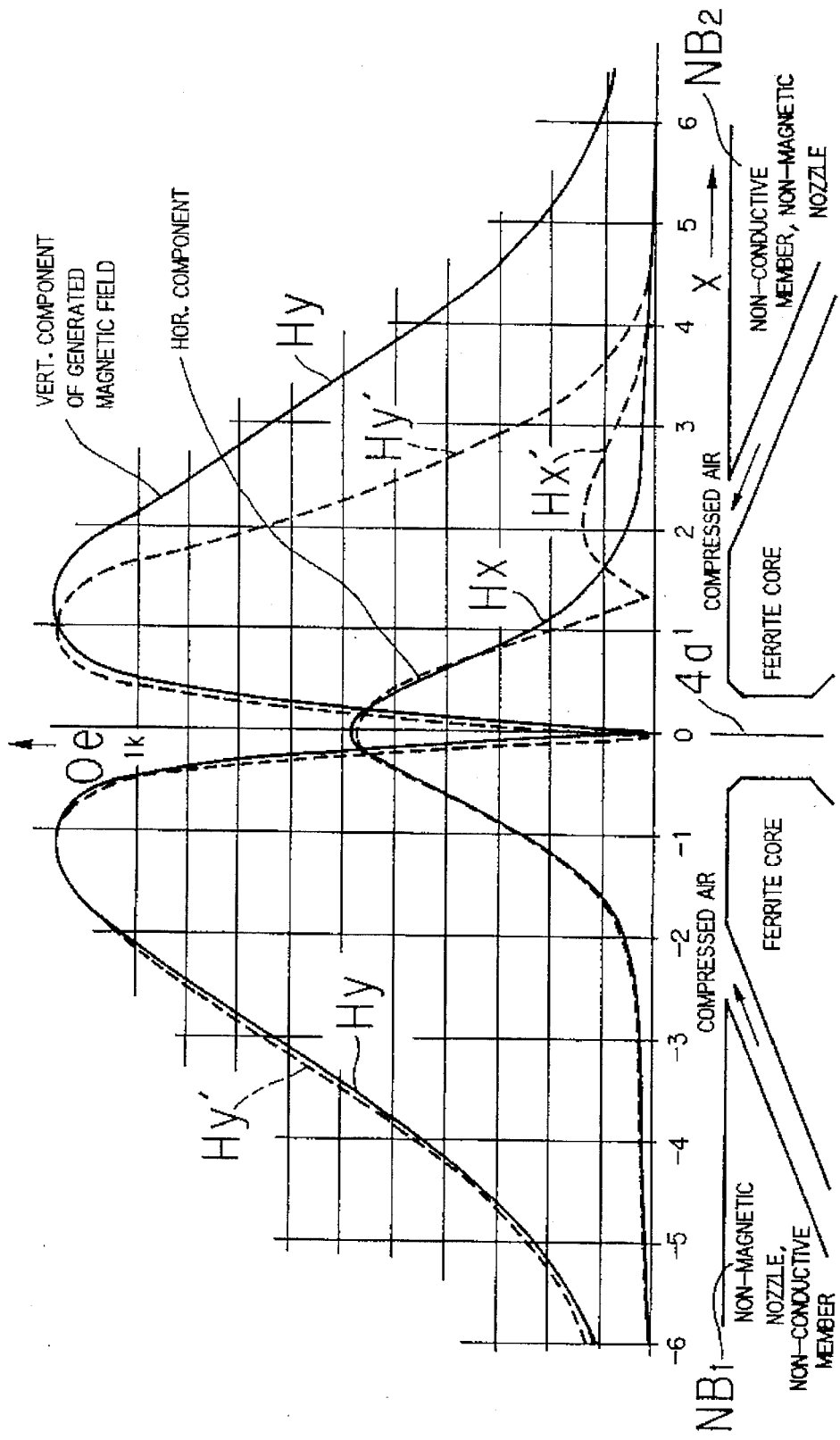
FIG. 2 is a graph showing a leakage magnetic field distribution characteristics in a magnetic gap 4a of a C type magnetic head of the conventional bias field generator shown in FIG. 1, which is obtained by a model experiment.

Since the bias magnetic field for information transfer generated by the bias magnetic field generating head TBH includes a strong single peak vertical component and a small horizontal component, the information transfer performed by using the bias magnetic field generated by the bias magnetic field generating head TBH does not have the problem of the conventional bias field generator that, due to the twin peaked magnetic field distribution in the magnetic gap 4a of the magnetic head 4 (FIG. 1) such as shown by the solid curve Hy in FIG. 2, the master magnetic recording medium tends to be demagnetized by the portion of the magnetic field distribution on the left side of the center position of the magnetic gap 4a.

In the first embodiment of the present invention, the output signal of the flux detection coil 24 provided in the vicinity of the main magnetic pole 19 of the bias magnetic field generating head TBH is automatically controlled by the automatic control circuit such that its value becomes the predetermined reference value to thereby make the transfer magnetic field strength constant. Therefore, even when the distance g between the top end portion of the main magnetic pole 19 and the outer surface of the rotary magnetic cylinder member 9 is varied for some reason, a bias current is supplied from the bias current supply circuit constituted as shown in FIG. 5 to the exciting coil 23 wound on the magnetic path between the main pole 19 and the core member 20.

In the bias current supply circuit shown in FIG. 5, a reference numeral 35 depicts a bias signal generator portion which may be constructed with a frequency divider (programmable frequency divider) for converting frequency of a reference signal generated by a reference oscillator contained therein or a reference signal supplied from an external reference signal source into a predetermined frequency and a phase-locked-loop (PLL), etc.

The bias signal generated by the signal generator portion 35 and having the predetermined frequency is supplied to a pulse width modulation control circuit 36 and a head resonance circuit 39. An output signal of the pulse width modulation control circuit 36 is supplied to a H bridge circuit 37 including a switching element by which a voltage applied between a terminal 38 and a ground is switched according to an output signal of the pulse width modulation control circuit 36 to obtain a bias current which is supplied to the exciting coil 23 through the head resonance circuit 39 including a coupling circuit 40 including a control coil and a resonance capacitor 41.

Since, due to magnetomotive force generated correspondingly to the bias current supplied to the exciting coil 23, the closed magnetic circuit from the portion of the magnetic path on which the exciting coil 23 is wound, through the main magnetic pole 19, the outer peripheral surface of the rotary magnetic cylinder member 9, the rotary magnetic cylinder member 9, the gap between the cylinder member 9 and the core member 20 back to the magnetic path on which the exciting coil 23 is wound is established, the flux detection coil 24 wound in the vicinity of the top end portion of the main magnetic pole 19 outputs a flux detection signal corresponding to flux extending through a magnetic circuit from the main magnetic pole 19 through the gap g to the rotary magnetic cylinder member 9, that is, the flux detection signal indicative of a differentiated flux amount in the magnetic circuit.

The flux detection signal is supplied to a peak value detector circuit 42 in which it is integrated to obtain a flux signal a peak value of which is converted by an operational amplifier into a D.C. voltage value. The D.C. voltage is supplied to an input circuit of an error amplifier in the pulse modulation control circuit 36.

In an error amplifier circuit included in the pulse modulation control circuit 36, when the gap g between the main magnetic pole 19 and the outer peripheral surface of the rotary magnetic cylinder member 9 has a predetermined value (for example, g: 75 μm), and the D.C. voltage Vs which is determined on the basis of the flux detection signal generated in the flux detection coil 24 wound in the vicinity of the top end portion of the main magnetic pole 19, the value of which is proportional to the magnetic field strength Hs (for example, Hs=2000 oersted) generated in the gap, is compared with a predetermined reference voltage Vs, for example, 2 volts, to generate an error signal. The pulse width modulation control circuit 36 responds to a polarity and magnitude of the error signal and controls width of the bias signal supplied from the signal generator 35 to the pulse modulation control circuit 36 such that the error signal becomes zero.

Thus, a closed automatic control loop is established from the pulse width modulation control circuit 36 through the H bridge circuit 37, the exciting coil 23, the main magnetic pole 19, the flux detection coil 24 and the peak value detector circuit 42 to the control circuit 36, with which the transfer bias magnetic field strength can always be maintained at the predetermined value even if the gap g between the top end portion of the main magnetic pole 19 and the outer surface of the rotary magnetic cylinder member 9 is varied for some reason.

It should be noted that, since, at an operation start time of the transfer bias magnetic field generator of the magnetic information transfer system, there is no magnetic flux in the main magnetic pole 19, there is no flux detection signal is output from the flux detection coil 24 and the D.C. voltage from the peak value detection circuit 42 is zero. In this case, the error amplifier circuit in the pulse width modulation control circuit 36 outputs the predetermined reference voltage Vs which is 2 volts in this example as the error signal and the output pulse signal of the pulse width modulation control circuit 36 has the maximum width and is supplied to the H bridge circuit 37, with which a switching element such as MOS-FET, transistor, etc., included in the latter circuit is activated to on-off switch a circuit between the power source terminal 38 and the ground to generate the bias current which is supplied to the exciting coil 23 to thereby generate magnetic flux passing from the main magnetic pole 19 through the gap g, the rotary magnetic cylinder member 9, the core member 20 and back to the main magnetic pole 19. Thus, the previously mentioned normal operation is performed.

As described, in the bias magnetic field generator for use in a magnetic information transfer system, according to the present invention, a master magnetic recording medium and a slave magnetic recording medium having a magnetic surface faced to a magnetic surface of the master magnetic recording medium are made in pressure-contact with an outer peripheral surface of a rotary magnetic cylinder member at least an outer peripheral surface portion of which is of high permeability material with the magnetic surfaces of the master and slave tapes being in intimately contact with each other, a bias magnetic field alternating at a predetermined frequency is generated between a main magnetic pole provided in a plane in the vicinity of a surface of the pressure-contact region of the lamination of the master and slave magnetic recording media having the other surface in pressure-contact with the outer peripheral surface of the rotary magnetic cylinder member, having a width wide enough to cover a width of the lamination completely and having a tapered top end portion faced to the surface of the pressure-contact region of the lamination and the outer peripheral surface of the rotary magnetic cylinder member, a magnetic return path is provided between a magnetic core member having a surface in proximity to the outer peripheral surface of the rotary magnetic cylinder member and extending in the direction of the outer peripheral surface of the rotary magnetic cylinder member by a distance substantially larger than a minimum distance between the tapered top end portion of the main magnetic pole and the outer peripheral surface of the rotary magnetic cylinder member, further a magnetic flux detection coil is provided in the vicinity of the tapered top end portion of the main magnetic pole for detecting flux in the main magnetic pole so that a magnitude of a bias current is automatically controlled by a closed automatic control circuit such that a signal detected by the flux detection coil becomes a predetermined reference value to thereby make the transfer bias magnetic field constant. Therefore, with the transfer bias magnetic generator according to the present invention, it is possible to stably generate a single peaked transfer bias magnetic field a major portion of which is a vertical magnetic component effective for magnetic transfer of information. With such single peaked bias magnetic field, the master magnetic recording medium is subjected to demagnetization only once, and, with the operation of the closed automatic control circuit, it is possible to control the bias magnetic field strength to a constant value even if the distance between the top end portion of the main magnetic pole and the outer peripheral surface of the rotary magnetic cylinder member is varied for some reason. Further, the configuration of the top end portion of the main magnetic pole can be freely determined by merely considering magnetic saturation of magnetic material of the main magnetic pole. For example, when it is necessary to construct the main magnetic pole having a sharp magnetic field slope characteristics, it can be easily realized by providing a minimum amount of metal piece in the vicinity of the main magnetic pole or providing a magnetic thin metal film on the top end portion of the main magnetic pole. Therefore, according to the present invention, a transfer bias magnetic field generator having high head efficiency can be easily realized without necessity of increasing bias signal frequency. Further, with the stable single peaked bias magnetic field, the provision of the metal piece or thin magnetic metal film in the vicinity of the magnetic head does not degrade the efficiency and a compact and high efficiency bias magnetic field generator can be provided.

Figure 6:
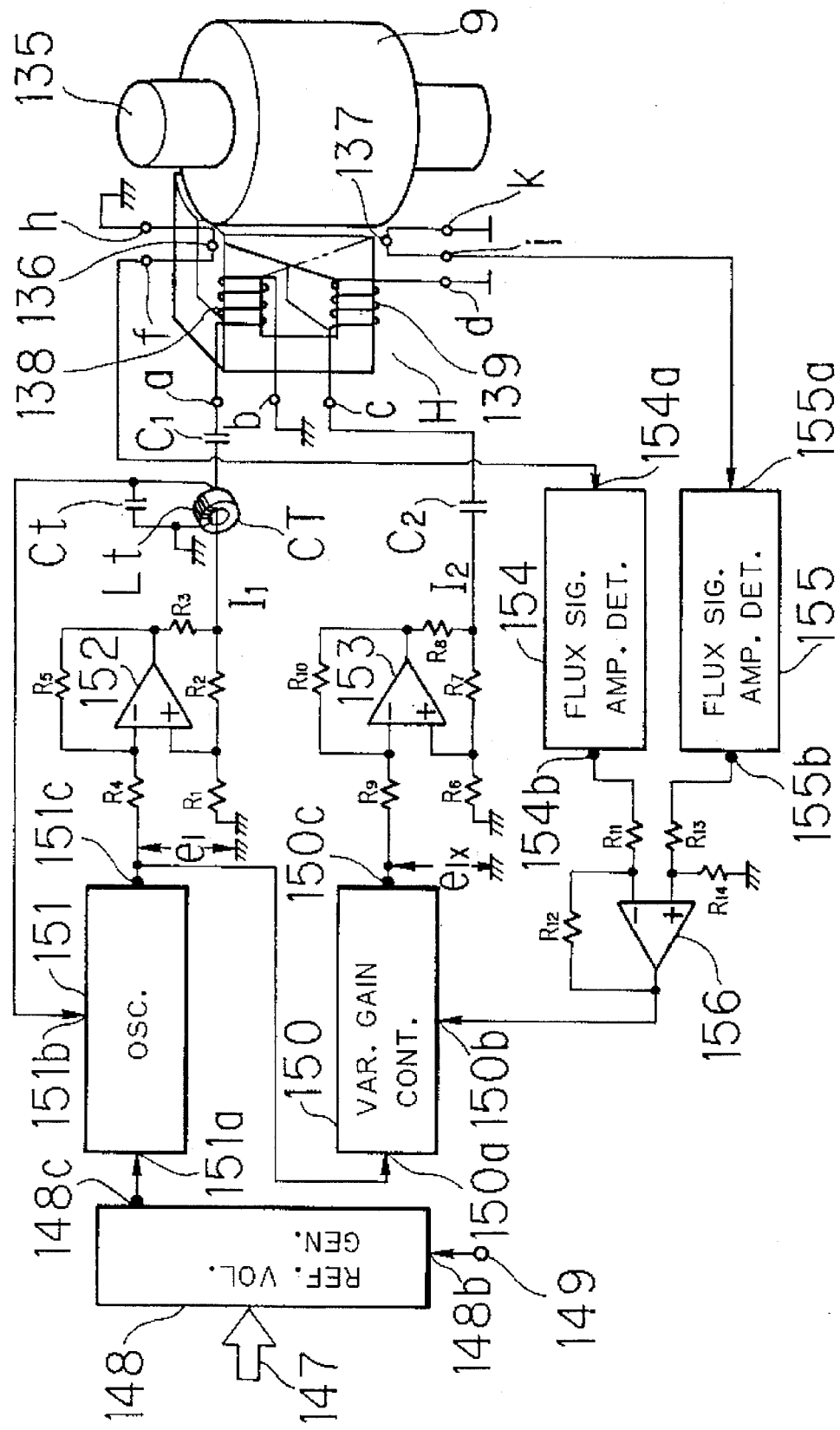
FIG. 6 is a block circuit diagram showing a construction of a bias magnetic field generator according to a third embodiment of the present invention.
Figure 7:
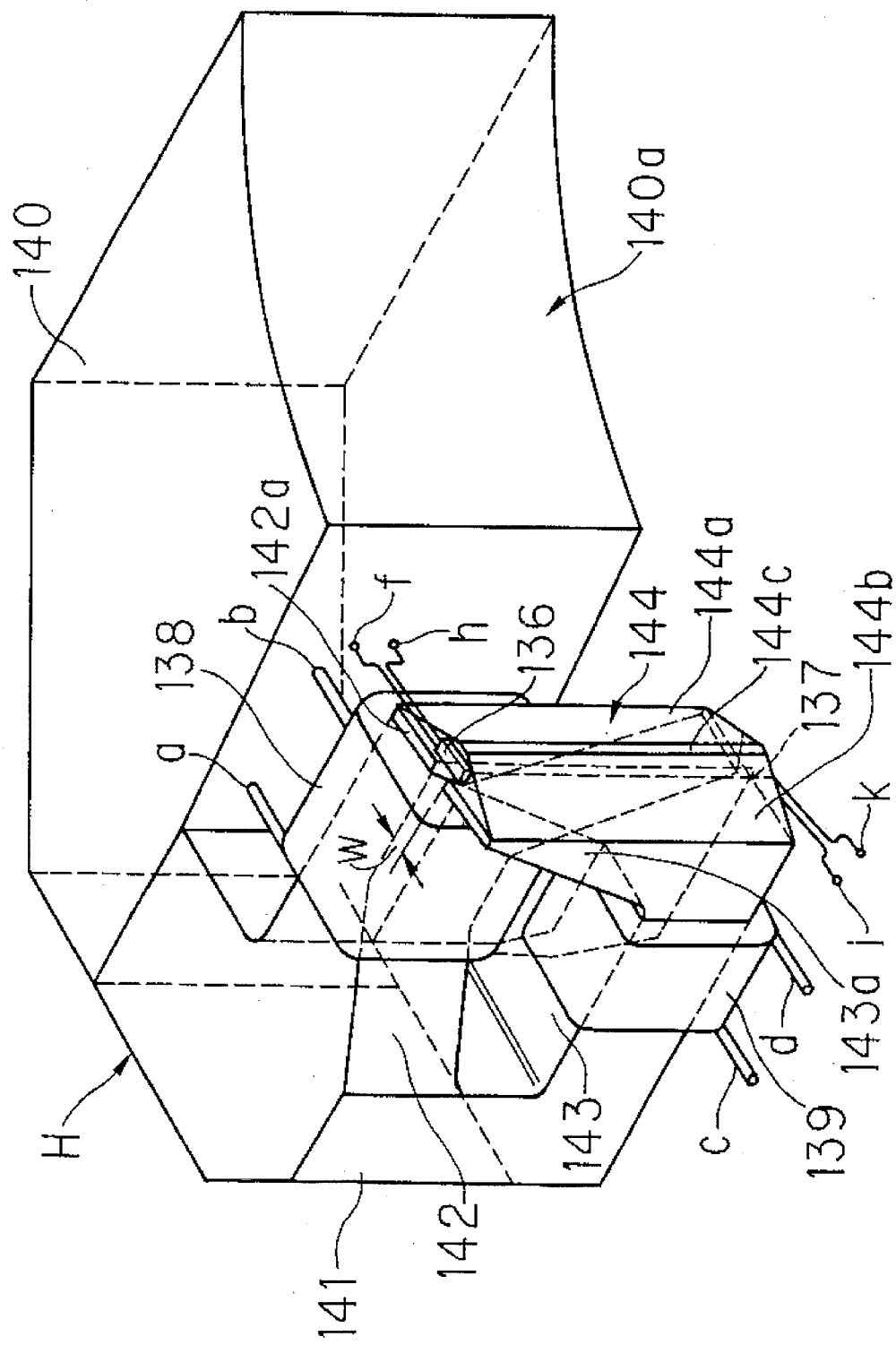
FIG. 7 is a perspective view of a core structure of a bias magnetic field generating head used in the bias magnetic field generator according to the third embodiment.
Figure 8:
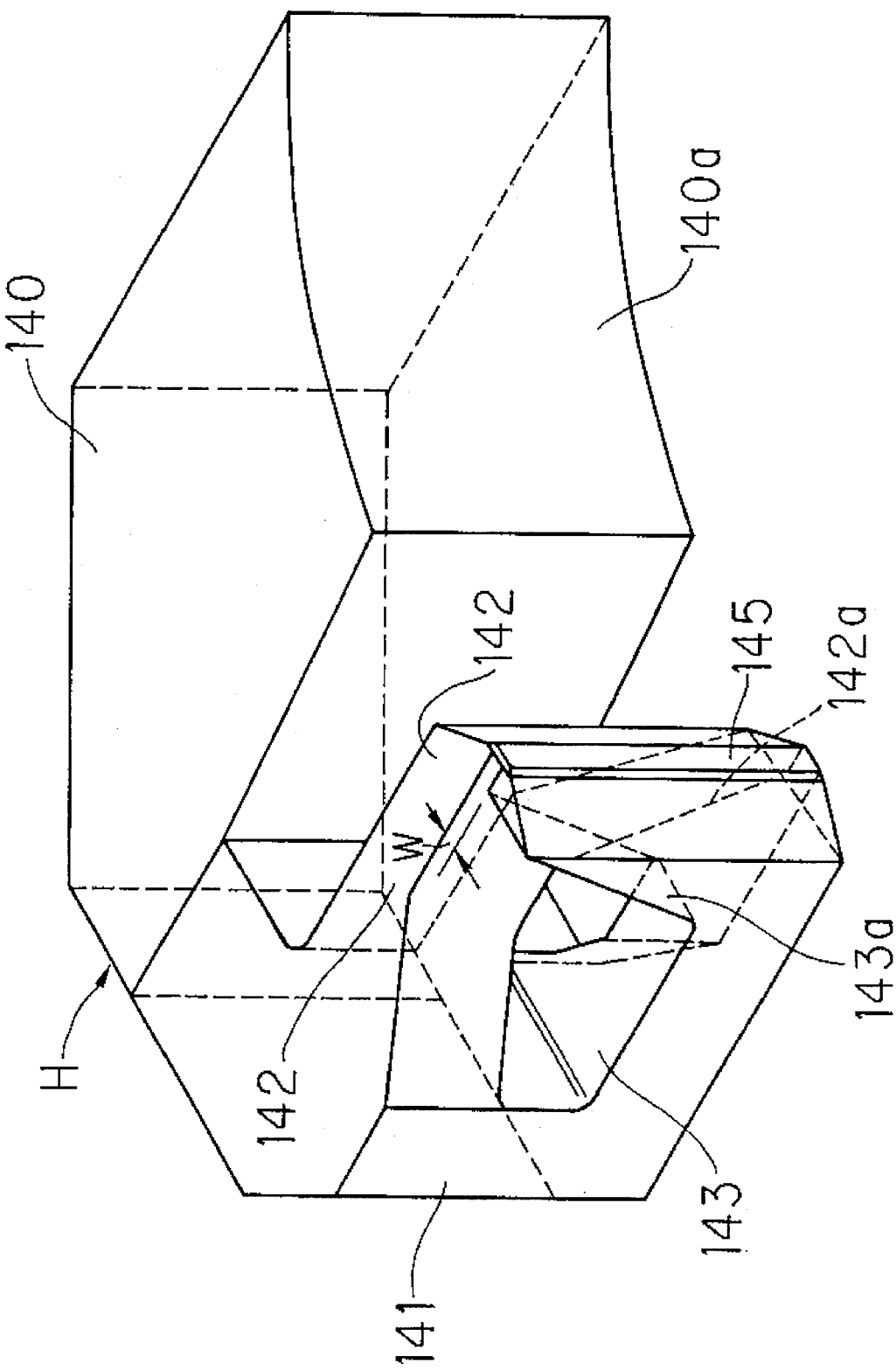
FIG. 8 is a perspective view of a core portion of the bias magnetic field generating head used in the bias magnetic field generator according to the third embodiment.
Figure 9:
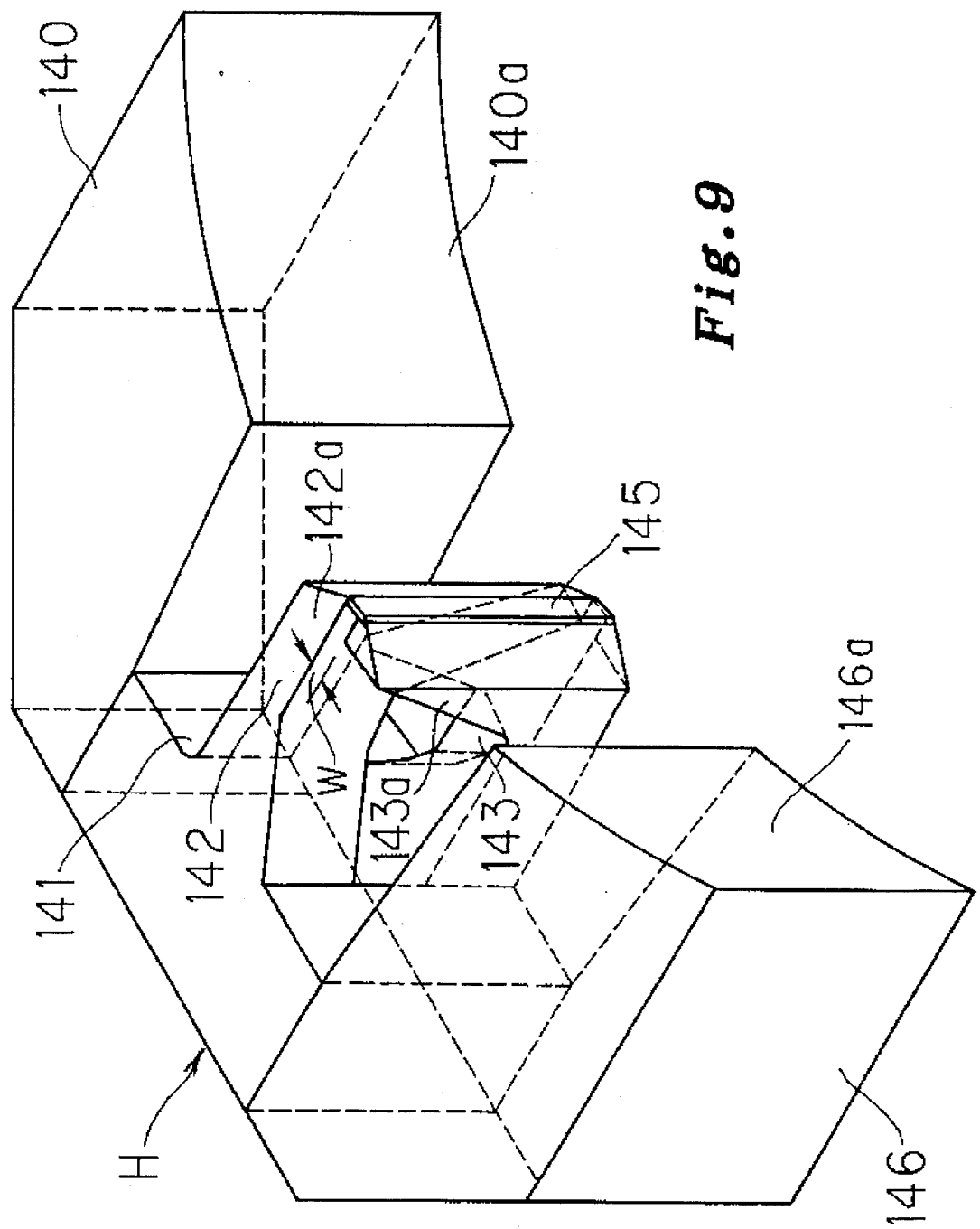
FIG. 9 is a perspective view of another structure of the core portion of the bias magnetic field generating head used in the bias magnetic field generator according to the third embodiment.
Figure 10:
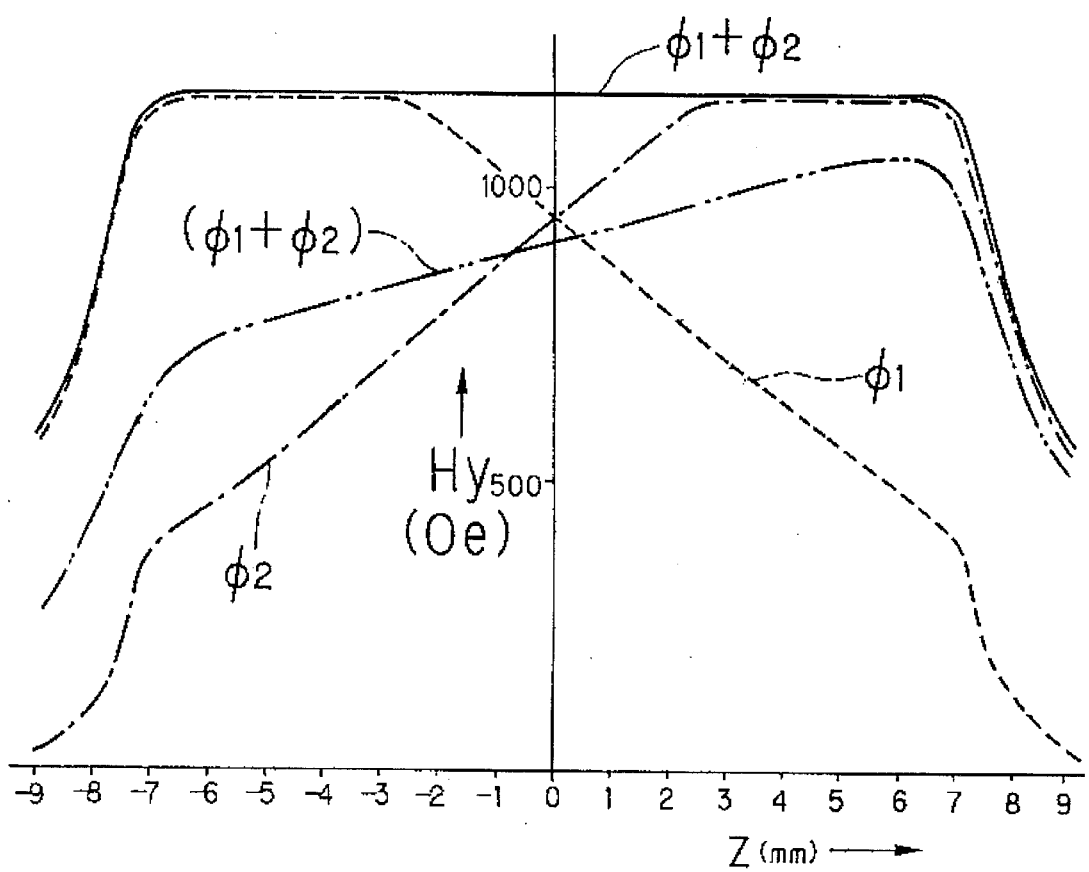
FIGS. 10(a) and 10(b) show a magnetic field strength distribution characteristics useful in explaining a constructive and operational principles of the third embodiment of the present invention.
Figure 10:
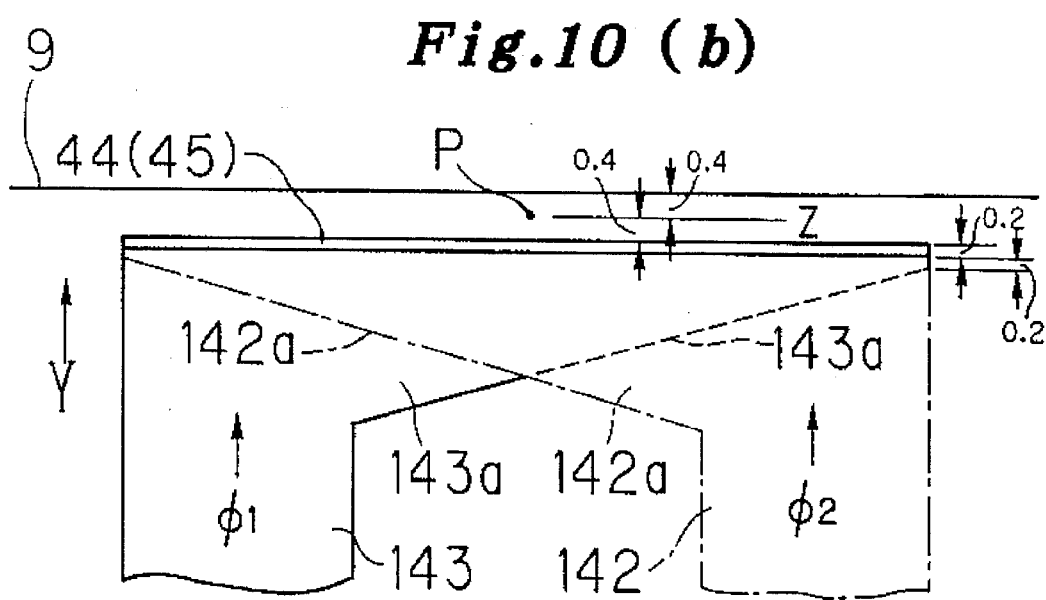
Figure 14:
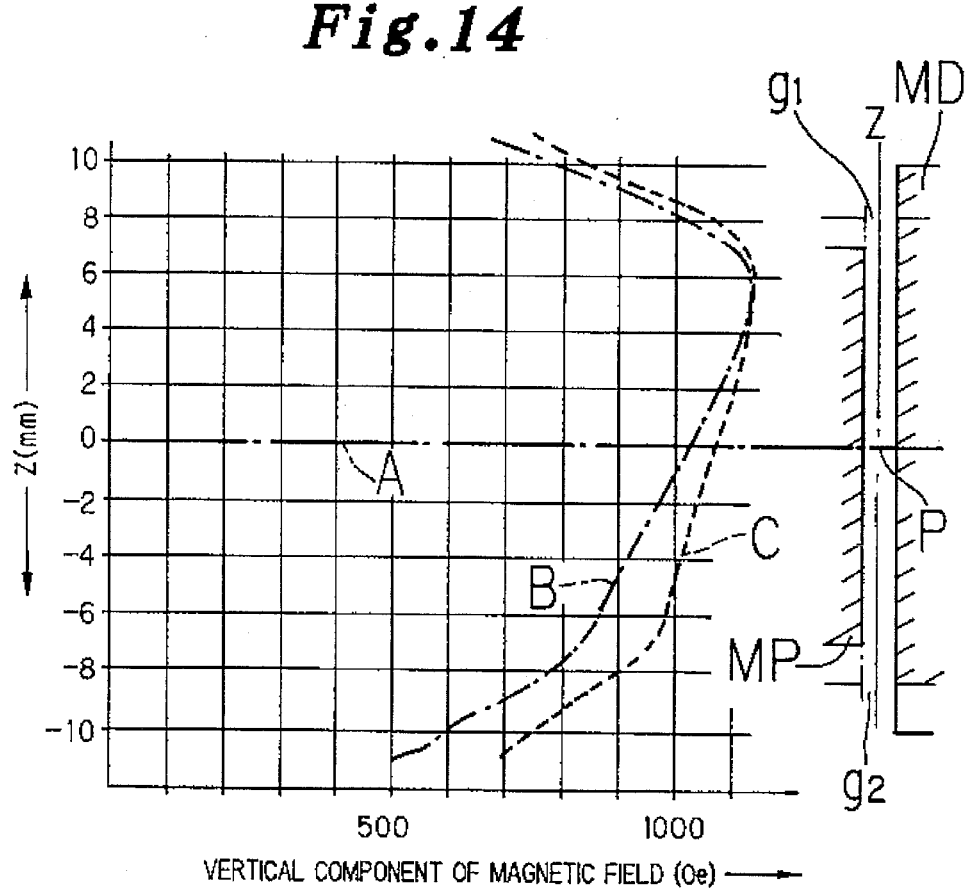
FIG. 14 is a characteristics curve showing a relation between inclination of a magnetic pole of the bias magnetic field generator head and a vertical magnetic field component.
Figure 15:
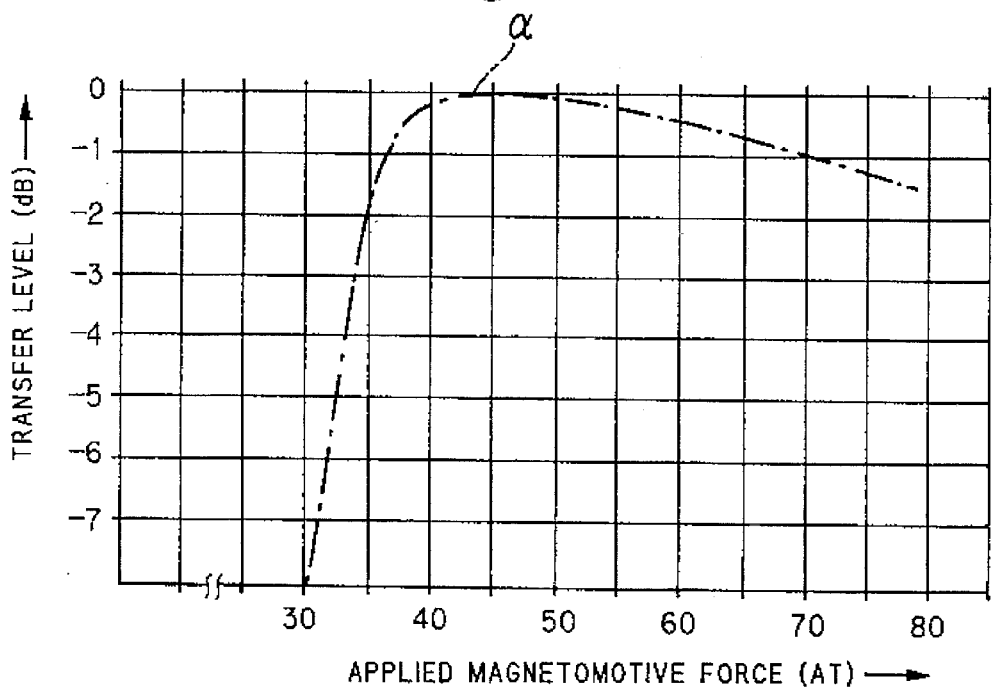
FIG. 15 is a characteristics curve showing a relation between magnetomotive force and transfer level.
Figure 16:
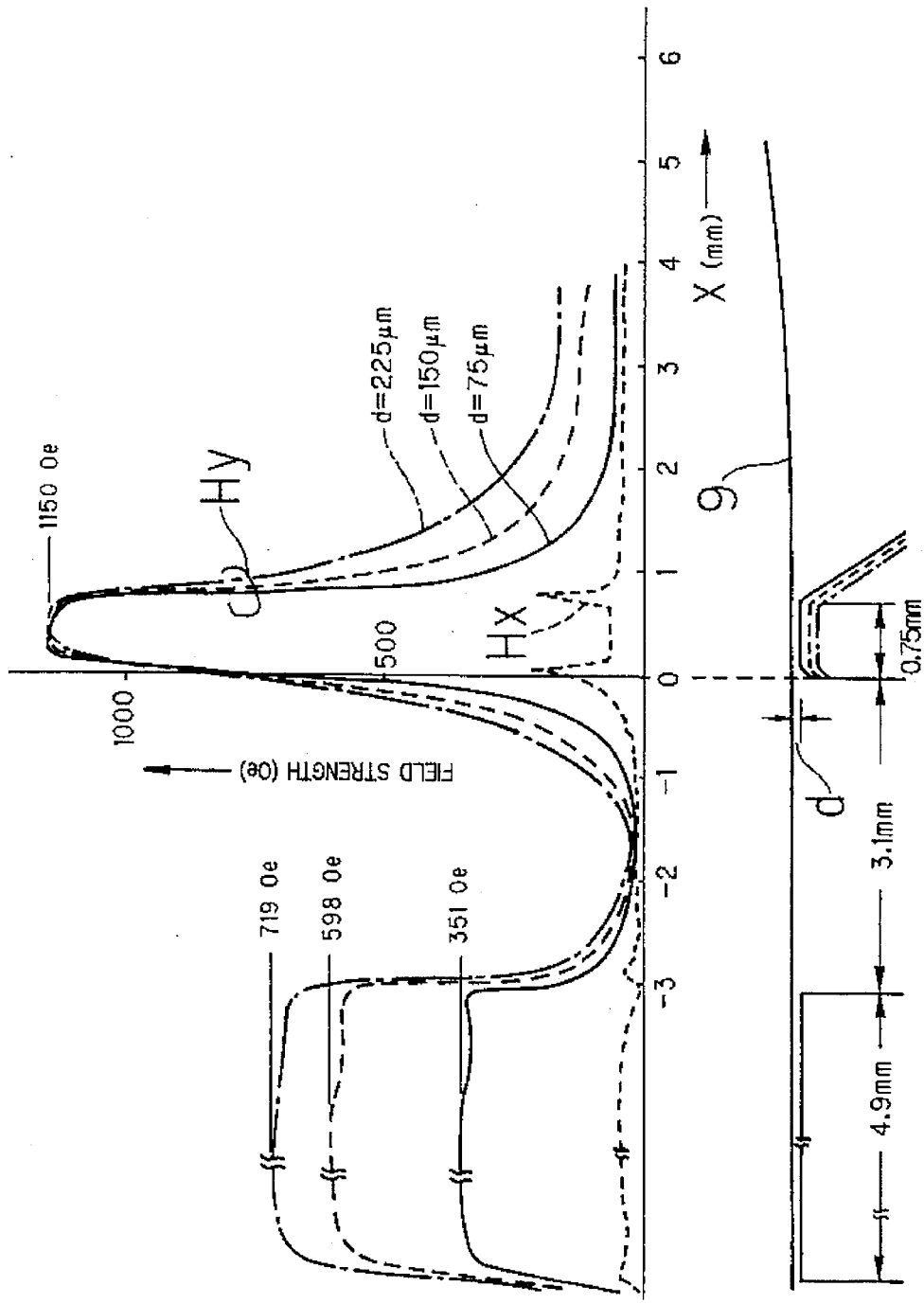
FIG. 16 shows a magnetic field strength distribution characteristics of the bias magnetic field generator head used in the bias magnetic field generator according to the second embodiment shown in FIG. 4.

A third embodiment of the present invention will be described with reference to FIGS. 6 to 16. FIG. 6 is a block diagram of a transfer bias magnetic field generator according to the third embodiment, FIGS. 7 to 9 are perspective views showing various constructions of a core of a transfer bias magnetic field generating head used in the transfer bias magnetic field generator, respectively, FIGS. 10(a) to 13 show magnetic field distribution characteristics for explanation of a constructive principle and an operational principle of the present invention, FIG. 14 is a graph showing a relation between an inclination of a magnetic pole of the head and a vertical component of the magnetic field, FIG. 15 is a graph showing a relation between a magnetomotive force and transfer level and FIG. 16 is a graph showing a magnetic field strength distribution characteristics of the magnetic head.

In the transfer bias magnetic field generator according to the third embodiment of the present invention, a master magnetic recording medium and a slave magnetic recording medium are made in pressure-contact with an outer peripheral surface of a rotary magnetic cylinder member by pressurized-air with magnetic surfaces of the magnetic recording media being intimately faced to each other and run with rotation of the rotary magnetic cylinder member. A core member having a wide face positioned in proximity to and along with the outer peripheral surface of the rotary magnetic cylinder member is provided in a position separated in a peripheral direction of the rotary magnetic cylinder member by a distance substantially larger than a distance between the outer peripheral surface of the rotary magnetic cylinder member and a top end portion of a main magnetic pole of a bias magnetic field generating head, which has a small width in a tape running direction and extends to cover at least the full width of the magnetic recording medium. A coil portion core having at an end portion thereof a branched magnetic pole constituting portion to branch magnetic flux passing therethrough and magnetically coupled to the core member and exciting coils mounted on the respective branched portions of the coil portion core constitute electrical regulation device for controlling exciting current supplied to the exciting coils from respectively provided magnetomotive force supply device. By changing magnetomotive forces generated in the respective exciting coils, a transfer bias magnetic field strength toward the magnetic recording media in the width direction thereof can be made uniform. Now, the possibility of regulating the magnetic field by means of the electrical regulation so that it becomes uniform will be described with reference to FIGS. 10(a) to 13.

Figure 13:
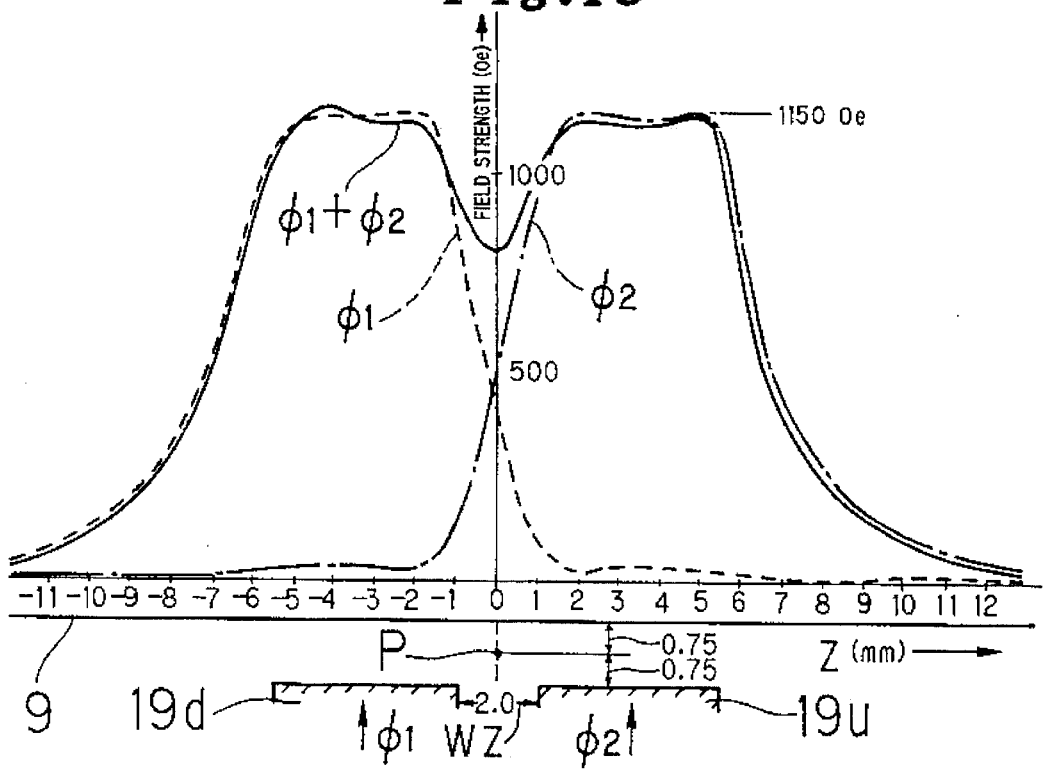
FIG. 13 shows another magnetic field strength distribution characteristics useful in explaining a constructive and operational principles of the third embodiment of the present invention.

FIG. 13 shows a magnetic field strength distribution in a width direction Z of a magnetic recording medium at an intermediate position (a straight line including a point P in FIG. 13) of a gap between end portions of magnetic pole portions 19u and 19d provided by dividing a single main magnetic pole 19 such as shown in FIGS. 3 or 4 in a width direction (direction Z in FIG. 13) of a magnetic recording medium to two portions arranged in series in the width direction Z with a predetermined gap WZ therebetween and arranged in facing relation to an outer peripheral surface of a rotary magnetic cylinder member 9 with a constant distance thereto and the outer peripheral surface of the rotary magnetic cylinder member 9. Exciting coils (not shown) are provided for the magnetic pole portions 19u and 19d, respectively. A dotted curve φ1 in FIG. 13 shows the magnetic field strength distribution of a magnetic field generated by the magnetic pole portion 19d in the width direction Z of the magnetic tape at an intermediate position (a straight line including a point P in FIG. 13) when exciting current is supplied to only the exciting coil wound on the magnetic pole portion 19d.

A chain line curve φ2 in FIG. 13 shows the magnetic field strength distribution of a magnetic field generated by the magnetic pole portion 19u in the width direction Z of the magnetic tape at the intermediate position (straight line including the point P in FIG. 13) when exciting current is supplied to only the exciting coil wound on the magnetic pole portion 19u. The solid curve φ1+φ2 in FIG. 13 shows a combined magnetic field strength distribution of the magnetic fields generated by the magnetic pole portions 19u and 19d in the width direction Z of the magnetic tape at the intermediate position (straight line including the point P in FIG. 13) when exciting current is supplied to both of the exciting coils wound on the magnetic pole portions 19u and 19d to generate in-phase magnetomotive forces in these exciting coils. It is clear from the solid line curve that there is a dip in a portion thereof corresponding to the gap WZ. In FIGS. 10(a) through 13, when both the magnetic pole portions 19u and 19d are excited, a total exciting current to the portions is reduced to generate the same peak field strength for a convenience of comparison.

Figure 12:
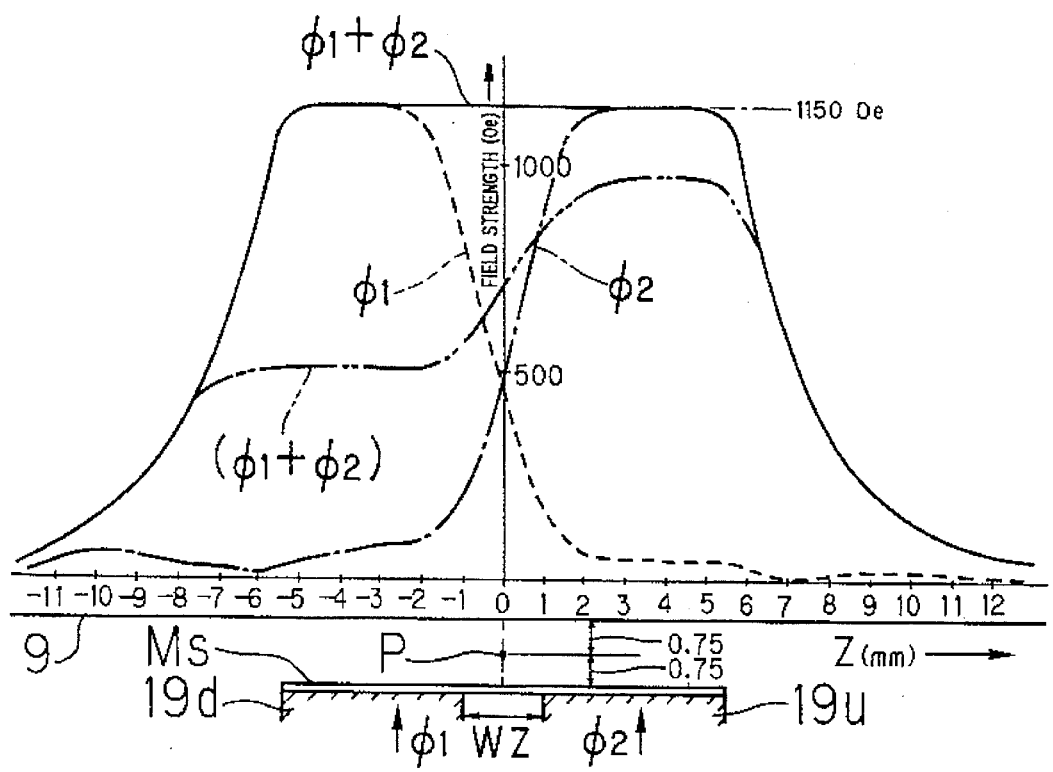
FIG. 12 shows another magnetic field strength distribution characteristics useful in explaining a constructive and operational principles of the third embodiment of the present invention.

FIG. 12 is similar to FIG. 13 and shows a magnetic field strength distribution in the width direction Z of the magnetic tape at the intermediate position (straight line including the point P in FIG. 12) of a gap between end portions of the magnetic poles portions 19u and 19d provided by dividing the main magnetic pole 19 in the width direction (direction Z in FIG. 12) of the magnetic recording medium to two portions arranged in series in the width direction Z with a predetermined gap WZ therebetween and the outer peripheral surface of the rotary magnetic cylinder member 9. Pole faces of the magnetic pole portions 19u and 19d are magnetically coupled to each other by means of a thin film Ms of soft magnetic material. Exciting coils (not shown) are provided for the magnetic pole portions 19u and 19d, respectively.

A dotted curve φ1 in FIG. 12 shows the magnetic field strength distribution of a magnetic field generated by the magnetic pole portion 19d in the width direction Z of the magnetic tape at the intermediate position (straight line including the point P in FIG. 12) when exciting current is supplied to only the exciting coil wound on the magnetic pole portion 19d and a chain line curve 100 2 in FIG. 12 shows the magnetic field strength distribution of a magnetic field generated by the magnetic pole portion 19u in the width direction Z of the magnetic tape at the intermediate position (straight line including the point P in FIG. 12) when exciting current is supplied to only the exciting coil wound on the magnetic pole portion 19u.

The solid curve φ1+φ2 in FIG. 12 shows a combined magnetic field strength distribution of the magnetic fields generated by the magnetic pole portions 19u and 19d in the width direction Z of the magnetic tape at the intermediate position (straight line including the point P in FIG. 12) when exciting current is supplied to both of the exciting coils wound on the magnetic pole portions 19u and 19d to generate magnetomotive forces which are in-phase and identical in strength in these exciting coils. It is clear from the solid line curve φ1+φ2 shown in FIG. 12 that there is no such dip as shown in FIG. 13 in a portion thereof corresponding to the gap WZ. With such thin film Ms of soft magnetic material magnetically coupling or magnetically short-circuiting the magnetic pole portions 19u and 19d, electromagnetic conversion efficiency may be reduced.

Comparing the case shown by the solid curve φ1+φ2 with a case shown by a dotted chain line (φ1+φ2) in FIG. 12 where magnetomotive forces which are in-phase and different in strength such that magnetomotive force generated by one of the magnetic pole portions is a half of that generated by the other magnetic pole portion, it becomes clear that the magnetic field strength distribution in the intermediate position (straight line including the point P in FIG. 12) in the width direction Z can be changed by relatively changing the magnetomotive forces generated on the exciting coils.

Although, from the solid line characteristics φ1+φ2 and the dotted chain line characteristics (φ1+φ2) in FIG. 12, it is possible to control the magnetic field strength distribution in the tape width direction Z by relatively change the magnetomotive forces generated in the exciting coils by regulating electric currents supplied thereto, a region of such bias magnetic field generating head having such structure as shown in FIG. 12 in which the magnetic field strength distribution can be changed linearly is very narrow as shown by the dotted chain line characteristics (φ1+φ2) in FIG. 12. Therefore, the magnetic recording medium having width applicable to such narrow region is limited.

As a result of lengthy study to solve this problem, it has become possible to obtain a magnetic field strength distribution which is uniform in the tape width direction Z and a variation characteristics of magnetic field strength distribution such as shown in FIG. 10(a) by using a bias magnetic field generating head (see FIGS. 7 to 9) whose magnetic pole has top end portion shaped as shown in FIG. 10(b). Incidentally, a magnetic field strength distribution characteristics shown in FIG. 11(a) is obtained by a bias magnetic field generating head shown in FIG. 11(b) which is the head shown in FIG. 10(b) with its core 144 (145) in the top end portion of the magnetic pole being removed.

In FIGS. 10(b) and 11(b), structural components constituting the bias magnetic field generating magnetic pole shown by reference numerals 142, 142a, 148, 143a, 144 and 144a, etc., correspond to those of the magnetic head H which are shown in detail in FIGS. 7 to 9 by using the same reference numerals, respectively. Further, the outer peripheral portion of the rotary magnetic cylinder member 9 shown in FIG. 6 is also shown in FIGS. 10(b) and 11(b) partially, respectively. Further, the components depicted by 142a, 143a, 144 and 145, etc., may correspond to those of the main magnetic pole 19 of the first embodiment shown in FIGS. 1 and 3, respectively.

In FIGS. 10(b) and 11(b), the components 142a and 143a are branched magnetic pole constituting portions of the bias magnetic field generating head H, respectively, in which the component 142a is provided in the top end portion of the core 142 and the component 143a is provided in the top end portion of the core 143.

The magnetic pole constituting components 142a and 143a are arranged along the outer peripheral surface of the rotary magnetic cylindrical member 9 with a small gap W (FIGS. 7 to 9) therebetween. A cross sectional area of the core 142 supporting the component 142a in a plane orthogonal to a center axis 135 of the rotary magnetic cylinder member 9 gradually increases along a predetermined direction parallel to the center axis 185.

A cross sectional area of the core 143 supporting the component 143a in a plane orthogonal to the center axis 135 of the rotary magnetic cylinder member 9 gradually decreases along the predetermined direction parallel to the center axis 135. Exciting coils 138 and 139 (FIGS. 6 and 7) are mounted on the respective cores 142 and 143. Root portions of the cores 142 and 143 are connected by a base end portion core 141 to constitute a coil portion core.

The base end core 141 is magnetically coupled to a core member (for example, core 140 in FIGS. 7 and 8 and cores 140 and 146 in FIG. 9) of the bias magnetic generating head H, which has a wide face (140a in FIGS. 7 and 8, 140a and 146a in FIG. 9) facing to the outer peripheral surface of the rotary magnetic cylinder member 9 in proximity thereto. The wide face is separated from the top end portions 142a and 143a in peripheral direction of the rotary magnetic cylinder member 9 by a distance substantially larger than the minimum gap distance (g in FIG. 3) between the top end portions of the magnetic pole portions 142a and 143a.

A magnetic flux path for magnetic field generated in the cores 142 and 143 by exciting currents supplied to the exciting coils 138 and 139 mounted on the respective cores 142 and 143 is established from the top end portions of the magnetic pole constituting components 142a and 143a, through the outer peripheral surface of the rotary magnetic cylinder member 9, the inner portion of the rotary magnetic cylinder member 9, the core members (140 in FIGS. 7 and 8, 140 and 146 in FIG. 9) of the bias magnetic field generating head H, the base end core 141 to the respective cores 142 and 143.

The dotted curve φ1 in FIG. 11(a) shows the magnetic field strength distribution of a magnetic field generated in the magnetic pole portion 143 in the width direction Z of the magnetic tape at an intermediate position (a straight line including a point P in the figure) between the top end portions of the magnetic pole constituting portions 142a and 143a and the outer peripheral surface of the rotary magnetic cylinder member 9 when exciting current is supplied to only the exciting coil 139 wound on the magnetic pole portion 143.

A chain line curve φ2 in FIG. 11a shows the magnetic field strength distribution of a magnetic field generated in the magnetic pole portion 138 in the width direction Z of the magnetic recording medium at the intermediate position (straight line including the point P in FIG. 12) when exciting current is supplied to only the exciting coil 138 wound on the magnetic pole portion 142.

The solid curve φ1+φ2 in FIG. 11a shows a combined magnetic field strength distribution of the magnetic fields generated by the magnetic pole portions 142 and 143 in the width direction Z of the magnetic recording medium at the intermediate position ( straight line including the point P in the figure) when exciting current is supplied to both of the exciting coils 138 and 139 wound on the magnetic pole portions 142 and 143 to generate magnetomotive forces which are in-phase and identical in strength in these exciting coils. The solid line curve φ1+φ2 shown in FIG. 11a has a dip in a portion thereof corresponding to the gap WZ.

Top end portions 144 and 145 shown in FIG. 10(b) are cores which magnetically couple the pole constituting portions 142a and 143a of the magnetic pole of the bias magnetic field generating head H and are shown in FIGS. 7 to 9.

In the bias magnetic field generating head H shown in FIG. 10(b), when exciting current is supplied to only the exciting coil 139 mounted on the core portion 143, a resultant magnetic field strength distribution in the intermediate position between the outer peripheral surface of the drum 9 and the core portion 144 (145) in the magnetic recording medium width direction Z becomes as shown by a dotted curve 1.

A chain line curve $\phi 2$ in FIG. 10(a) shows a magnetic field strength distribution in the intermediate position between the outer peripheral surface of the rotary magnetic cylinder member 9 and the core portion 144 (145) in the tape width direction Z when exciting current is supplied to only the exciting coil 138 mounted on the core portion 142.

Figure 11:
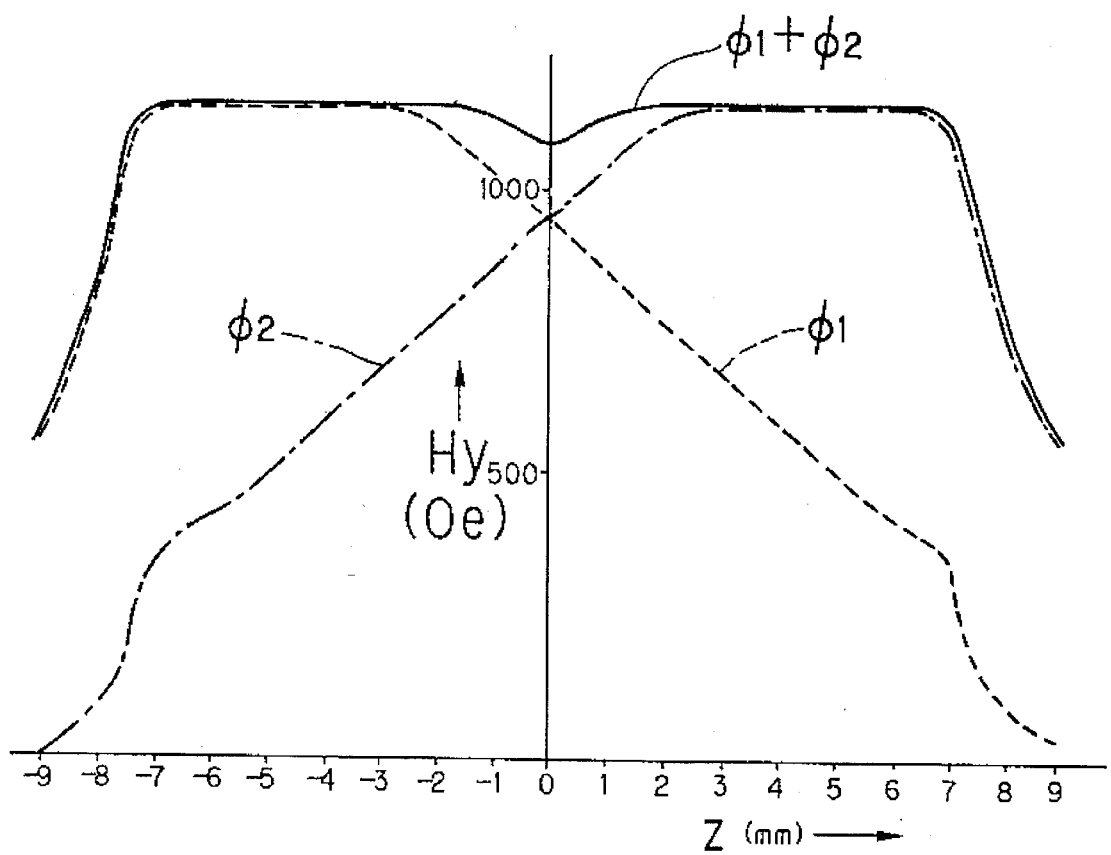
FIGS. 11(a) and 11(b) show another magnetic field strength distribution characteristics useful in explaining a constructive and operational principles of the third embodiment of the present invention.
Figure 11:
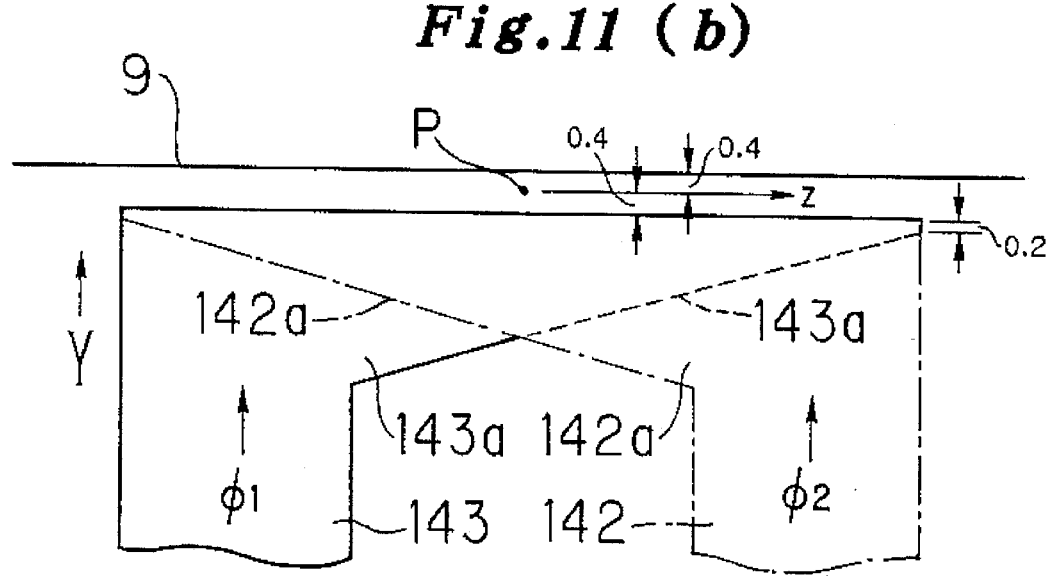

The solid curve $\phi 1+\phi 2$ in FIG. 10(a) shows a combined magnetic field strength distribution of the magnetic fields generated by the magnetic pole portions 142 and 143 in the width direction Z of the magnetic recording medium at an intermediate position (straight line including the point P in the figure) when exciting current is supplied to both of the exciting coils 138 and 139 wound on the magnetic pole portions 142 and 143 to generate magnetomotive forces which are in-phase and identical in strength in these exciting coils. It is clear from the solid line curve $\phi 1+\phi 2$ shown in FIG. 10(a) that there is no such dip as shown in FIG. 11 (a).

A dotted chain line ($\phi 1+\phi 2$) in FIG. 10(a) shows a combined magnetic field strength distribution of the magnetic fields generated by the magnetic pole portions 142 and 143 in the width direction Z of the magnetic recording medium at an intermediate position (straight line including the point P in the figure) when exciting current is supplied to both of the exciting coils 138 and 139 wound on the magnetic pole portions 142 and 143 to generate magnetomotive forces which are in-phase while magnetomotive force of the coil 139 is a half of that of the coil 138.

The dotted curve $\phi 1$, the dotted chain line curve 2, the solid curve $\phi 1+\phi 2$ and the dotted chain line curve ($\phi 1+\phi 2$) shown in FIG. 10(a) show, as mentioned previously, the magnetic field strength distributions of the magnetic fields generated in the gap between the top end core 144 (145) provided on the top end portions of the magnetic pole constituting portions 142(a) and 143(a) and the outer peripheral surface of the rotary magnetic cylinder member 9 in the width direction of the tape measured at the intermediate position of the gap (along the straight line passing the point P), with respect to variation of currents supplied to the exciting coils 138 and 139 mounted on the respective coil portion cores 142 and 143, respectively. In any of these curves, the region in which the magnetic field strength changes linearly is relatively wide and therefore there is no such problem as that mentioned with respect to FIGS. 12 and 13 in the transfer system using the magnetic head (FIGS. 7 to 9) having the magnetic pole structure shown in FIG. 10(b). In other words, an extensively long line of uniform flux density zone is formed in front of the main magnetic pole, and an angle of such line with respect to the rotation axis of the rotary cylinder can electrically be controlled within a plane passing the rotation axis, by making the main magnetic pole being bifurcated to have two legs and exciting them differently each other.

In FIGS. 7 to 9 which show a concrete construction of the bias field generating head H according to the present invention, the coil portion cores 142 and 143 are magnetically coupled with each other by the base portion core 141 and the top end portions of the cores 142 and 143 are arranged in the same plane with the small gap W therebetween, resulting in the magnetic pole constituting portions 142a and 143a, as mentioned previously.

Further, the exciting coil 138 having terminals a and b is wound on the coil portion core 142 and the exciting coil 139 having terminals c and d is wound on the core 143, as shown in FIG. 7. The exciting coils 138 and 139 are not shown in FIGS. 8 and 9.

The cross sectional area of the magnetic pole constituting portion 142a in a plane perpendicular to the center axis 135 (FIG. 6) of the rotary magnetic cylindrical member 9 gradually increases in a predetermined vertical direction parallel to the center axis 135 and the cross sectional area of the magnetic pole constituting portion 142b in the same plane gradually decreases in the predetermined direction.

In FIG. 7, the cross sectional area of each of the magnetic pole constituting portions 142a and 143a is rectangular and gradually increases in a predetermined horizontal direction, while, in FIGS. 8 or 9, the cross sectional area of each of the magnetic pole constituting portions 142a and 143a is trapezoidal and gradually increases in a predetermined horizontal direction, with cross sectional end faces of them having the smallest areas being substantially triangular.

In the bias magnetic field generating head H shown in FIGS. 7 or 8, the coil portion core constituted with the coil portion cores 142 and 143 and the base portion core 141 magnetically coupling these cores is magnetically coupled with the core member 140 having the wide face 140a in the vicinity of the outer peripheral surface of the rotary magnetic cylinder member 9 and separated in the outer peripheral direction of the rotary magnetic cylinder member 9 by a distance substantially larger than the minimum distance (g in FIG. 3) between the outer peripheral surface of the rotary magnetic cylinder member 9 and the magnetic pole constituting portions 142a and 143a. On the other hand, in the bias magnetic field generating head H shown in FIG. 9, the coil portion core is magnetically coupled with a core member 146 having the wide face 140a in the vicinity of the outer peripheral surface of the rotary magnetic cylinder member 9 and separated in the outer peripheral direction of the rotary magnetic cylinder member 9 by a distance substantially larger than the minimum distance (g in FIG. 3) between the outer peripheral surface of the rotary magnetic cylinder member 9 and the magnetic pole constituting portions 142a and 143a.

In the bias magnetic field generating head H shown in FIG. 7, a trapezoidal top end portion core 144 is fixedly secured to the faces of the magnetic pole constituting portions 142a and 143a which are arranged with the small gap W therebetween and face to the outer peripheral surface of the rotary magnetic cylinder member 9.

The core 144 is made of magnetic material whose permeability is ½ to 1/10 of that forming the cores 140 to 143.

The core 144 has a center portion 144c corresponding to the gap W between the core portions 142a and 143a. The center portion 144c has a very narrow width in the outer peripheral direction of the rotary magnetic cylinder member 9 and is provided as a strip member extending along the axis direction of the rotary magnetic cylinder member 9. The core 144 further includes sloped surfaces 144a and 144b on the both sides of the center portion 144c. Distances between the outer peripheral surface of the rotary magnetic cylinder member 9 and the sloped surfaces 144a and 144b are increase with increase of distance from the center portion 144c.

That is, the width of the center portion 144c of the core 144 in a direction parallel to the center axis 135 of the rotary magnetic cylinder member 9 is very small and the cross sectional area of the core 144 in a plane perpendicular to the plane including the gap W between the magnetic pole constituting portions 142a and 143a and the center axis 135 increases with increase of the distance from the center axis 135 of the rotary magnetic cylinder member 9. Therefore, the effective transfer bias magnetic field generated is concentrated in the center portion 144c.

Since the core 144 and the magnetic pole constituting portions 142a and 143a are magnetically in series, relative permeability of the core 144 should be as high as possible in view of magnetic efficiency. On the other hand, the relative permeability should be low to some extent in view of flux dispersion effect necessary to make the magnetic field uniform. When the core 144 is formed of the magnetic material having permeability of ½ to 1/10 of that forming the other core portions, as mentioned previously, it is possible to form uniform magnetic field by re-combining fluxes passing through the magnetic pole constituting portions 142a and 143a.

A flux leakage detection coil 136 is provided on an upper end face of the core 144 and another flux leakage detection coil 137 is provided on a lower face of the core 144. In FIGS. 7 to 9, the flux leakage detection coil 136 has terminals f and h and the flux leakage detection coil 137 has terminals i and k. The coils 136 and 137 detect flux leakage in a direction making an angle of 45° with respect to the direction from the core 144 to the outer peripheral surface of the rotary magnetic cylinder member 9, which is indicative of slope information of the core 144. Although, in FIGS. 8 and 9, such flux leakage detection coils are not shown, it is of course possible to provide such detection coils for them.

In the bias magnetic field generating head H shown in FIGS. 8 or 9, a magnetic pole top end portion core 145 made from a thin plate of magnetic material is fixedly secured to the faces of the magnetic pole constituting portions 142a and 143a facing to the outer peripheral surface of the rotary magnetic cylinder member 9.

Since the core 145 and the portions 142a and 143a are magnetically in series, relative permeability of the core 144 should be as high as possible in view of magnetic efficiency. On the other hand, the relative permeability should be low to some extent in view of flux dispersion effect necessary to make the magnetic field uniform. For this reason, the thin magnetic plate having anisotropic relative permeability showing substantially high permeability in thickness direction (direction of magnetic field) and relatively low permeability in a direction in a plane perpendicular to the magnetic field.

As the thin magnetic plate 145, it should have high magnetic saturation characteristics and medial relative permeability. For example, it can be shaped to a predetermined magnetic pole configuration by etching a thin silicon steel plate. As other material for forming the top end portion core 145, amorphous thin film magnetic material prepared by rapid cooling or thin film prepared by using film forming techniques such as sputtering.

FIG. 6 is a block diagram showing the transfer bias magnetic field generator according to the present invention, in which H depicts the bias magnetic field generating head, 9 depicts the rotary magnetic cylinder member and 135 depicts the rotary shaft of the rotary magnetic cylinder member 9, which were described with reference to FIGS. 7 to 9.

The terminal b of the coil 138 and the terminal d of the exciting coil 139 are grounded and a series circuit of a resonance capacitor C1 and resistors R1 and R2 is connected between the terminal a of the exciting coil 138 and the ground. A resistor R3 and an operational amplifier etc., are connected to a line connecting the capacitor C1 and the resistor R2. The line passes through a core of a current transformer CT. A resonance coil Lt is wound on the CT core and a resonance capacitor Ct is connected in parallel to the resonance coil Lt having one end grounded and the other end connected to a trigger input terminal 151b of an oscillator circuit 151 to form a positive feedback circuit for a signal having frequency in a resonance frequency range.

A series circuit of a resonance capacitor C2 and resistors R6 and R7 is connected between the terminal c of the exciting coil 139 and the ground, to which a resistor R8 and an operational amplifier 153, etc., are connected.

The terminals h and k of the flux leakage detection coils 136 and 137 are grounded and the terminal f of the coil 136 is connected to an input terminal 154a of a flux signal magnitude detection circuit 154. The terminal i of the coil 137 is connected to an input terminal 155a of a leakage signal magnitude detection circuit 155. Detection outputs of the coils 136 and 137 are substantially the same if parallelism of the front-end face of the core 144 (145) is maintained with respect to the outer peripheral surface of the rotary magnetic cylinder member 9. However, if the parallelism is not maintained therebetween, these outputs becomes dependent on direction and amount of slope of the front end face of the core 144 (145).

The flux signal amplitude detection circuits 154 and 155 each is an integration/detection circuit comprising, for example, an operational amplifier circuit. The flux signal amplitude detector circuit 154 (155) integrates and amplifies the output of the leakage flux detection coil 136 (137) to generate an amplitude signal corresponding to an amplitude of the leakage flux signal and convert it into a D.C. voltage. This conversion can be performed by an operational amplifier circuit constituted as a peak value detection circuit for converting a peak value into a D.C. voltage.

The output signal of the output terminal 154b of the flux signal amplitude detection circuit 154 is supplied through a resistor R11 to an inverted input terminal of the operational amplifier 156. The inverted input terminal of the amplifier 156 is connected through a resistor R12 to an output terminal of the amplifier 156.

The output signal from the output terminal 155b of the flux signal amplitude detection circuit 155 is supplied through a resistor R13 to non-inverted input terminal of the operational amplifier 156. The non-inverted input terminal of the operational amplifier 156 constitutes a differential amplifier circuit together with a resistance circuit composed of resistors R11 to R14 for differentiating the output signals of the flux signal amplitude detection circuits 154 and 155.

Gain of the operational amplifier 156 is calibrated according to a relation between the detection outputs of the leakage flux detection coils 136 and 137 and the slope of the front end face of the core 144 (145) when the front end face of the core 144 (145) of the bias magnetic field generating head H is not parallel to the outer peripheral surface of the rotary magnetic cylinder member 9. When the detection outputs of the leakage flux detection coils 136 and 137 are the same, the output of the operational amplifier 156 becomes ground potential and, when the detection output of the coil 136 increases, the operational amplifier 156 outputs a negative D.C. voltage and, when the output of the coil 137 increases, the operational amplifier 156 outputs a positive D.C. voltage. The output voltage of the operational amplifier 156 is supplied to a gain control input terminal 150b of a variable gain control circuit 150.

In FIG. 6, a field strength setting data 147 for externally setting a strength of magnetic field generated to a predetermined value is supplied to a reference voltage generator circuit 148. The field strength setting data 147 may be, for example, a BCD digital data. When a field generation signal is supplied from a field generation/stop signal input terminal 149 to a terminal 148b of the reference voltage generator circuit 148, the reference voltage generator circuit 148 outputs at its output terminal 148c a D.C. voltage (for example, 2000 volts) generated correspondingly to the setting data, which is supplied to an input terminal 151a of the oscillator circuit 151 as a D.C. control voltage.

The oscillator circuit 151 starts to oscillate in response to a positive feedback of the signal from the current transformer CT to its trigger input terminal 151b and outputs an oscillation output voltage ei corresponding to the D.C. control voltage supplied to the input terminal 151a at its output terminal 151c.

The oscillation output at the output terminal 151c of the oscillator circuit 151 is supplied through a resistor R4 to the inverted input terminal of the operational amplifier circuit 152 and to the input terminal 150a of the variable gain control circuit 150. The non-inverted input terminal of the operational amplifier circuit 152 is connected to a junction between the resistors R1 and R2 and a resistor R5 is connected between the inverted input terminal and the output terminal of the operational amplifier circuit 152. Further, the resistor R3 is connected between the resistor R2 and the output terminal of the operational amplifier circuit 152.

The parallel resonance circuit composed of the resonance capacitor Ct and the detection coil Lt constituting a secondary circuit of the current transformer CT has a circuit constant with which resonance frequency thereof becomes substantially the same as a series resonance frequency determined by the resonance capacitor C1 and the inductance of the exciting coil 138 of the head H. Since, as well known, the parallel resonance circuit composed of the detection coil Lt and the resonance capacitor Ct has an impedance which is high in the resonance frequency range, a signal component having frequency in the resonance frequency range is positively fed back to the trigger input terminal 151b of the oscillator circuit 151.

The oscillator circuit 151 in an initial state starts its oscillation by the positive feedback of the signal component having frequency in the resonance frequency range selected by the parallel resonance circuit of the detection coil Lt and the resonance capacitor Ct to the trigger input terminal 151b thereof and the oscillation signal is amplified by the operational amplifier 152 to obtain a current signal I1 which is supplied to the series resonance circuit composed of the resonance capacitor C1 and the inductance of the exciting coil 138 of the bias magnetic field generating head H. Further, the current signal I1 flows into a primary circuit of the current transformer CT to excite the parallel resonance circuit composed of the detection coil Lt and the resonance capacitor Ct constituting the secondary circuit of the transformer CT to thereby produce a signal component having a parallel resonance frequency substantially equal to the series resonance frequency determined by the inductance of the coil 138 and the capacitor C1. The signal component is supplied to the trigger input terminal 151b of the oscillator circuit 151 as a positive feedback signal with which the oscillator circuit 151 continues its oscillation at the predetermined frequency.

The variable gain control circuit 150 having the input terminal 150a to which the oscillation signal of the oscillator circuit 151 is supplied responds to the output signal of the operational amplifier 156 supplied to its gain control input terminal 150b as the control input signal to provide an output voltage eix whose gain is variable according to the control input signal and which is supplied from the output terminal 150c through the resistor R9 to the inverted input terminal of the operational amplifier circuit 153. The non-inverted input terminal of the operational amplifier 153 is connected to the junction between the resistors R6 and R7, a resistor R10 is connected between the inverted input terminal and the output terminal of the operational amplifier circuit 153 and a resistor R8 is connected between the resistor R7 and the output terminal of the operational amplifier circuit 153. A signal current I2 output from the output terminal of the operational amplifier circuit 153 through the resistor R8 is supplied to the series resonance circuit composed of the resonance capacitor C2 and the inductance of the exciting coil 139 of the head H.

The circuit arrangement composed of the operational amplifier circuit 152 and the resistors R1 to R5 and the circuit arrangement composed of the operational amplifier circuit 153 and the resistors R6 to R10 constitute constant current circuits called bilateral circuits, respectively. Circuit conditions under which each of these circuits perform constant current operations are, for the arrangement composed of the operational amplifier circuit 152 and the resistors R1 to R5, R1=R4 and R5=R2+R3, with which the constant output current I1=−ei·R5/R4. For the arrangement including the operational amplifier circuit 153 and the resistors R to R10, R6=R9 and R10=R7+R8, with which a constant output current I2= −eix·R10/R8·R9.

When the oscillator circuit 151 outputs at its output terminal 151c an oscillation output signal (exciting signal) of voltage value of ei, the constant output current I1 is supplied from the output terminal of the operational amplifier circuit 152 through the resistor R3 to the series resonance circuit composed of the resonance capacitor C1 and the inductance of the exciting coil 138 of the head H. In the initial state during which no exciting current is supplied to the exciting coil 138, the outputs of the leakage flux detection coils 136 and 137 are zero and the output voltage of the operational amplifier circuit 156 is at the ground potential.

Since the variable gain control circuit 150 is constructed such that gain thereof becomes 1 with ground potential supplied to its gain control input terminal 150b, decreases with negative voltage supplied to its gain control input terminal 150b and increases with positive voltage supplied thereto, the variable gain control circuit 150 in the initial state passes the voltage value ei from the output terminal 151c of the oscillator circuit 151 through it as it is, which is input to the inverted input terminal of the operational amplifier 153 through the resistor R9.

Therefore, the output current I2 from the operational amplifier circuit 153 in the initial state becomes a constant current which is I2=−ei·R10/R8·R9 and is supplied to the series resonance circuit composed of the resonance capacitor C2 and the inductance of the exciting coil 139 of the head H as an exciting current, while the output current I1 from the operational amplifier circuit 152 in the initial state becomes a constant current which is I1=−ei·R5/R3·R4. By setting values of the respective resistors constituting the resistance circuits of the operational amplifier circuits 152 and 153 as R1=R6, R2=R7, R3=R8, R4=R9 and R5=R10, identical exciting currents are supplied to the exciting coils 138 and 139 in the initial state. Assuming that identical magnetomotive forces are generated in the exciting coils 138 and 139 when identical currents are supplied thereto, the detection outputs of the leakage flux detection coils 136 and 137 become identical when the outer peripheral surface of the drum 9 is parallel to the front faces of the core 144 (145).

Therefore, the output of the operational amplifier 156 supplied with the output signals of the flux signal amplitude detection circuits 154 and 155 is maintained at ground potential.

When the outer peripheral surface of the drum 9 is slanted with respect to the front faces of the core 144 (145), the detection outputs of the leakage flux detection coils 136 and 137 vary correspondingly to slant. For example, when the detection output of the leakage flux detection coil 136 increases, the operational amplifier 156 outputs a negative voltage which is supplied to the gain control input terminal 150b of the variable gain control circuit 150. Therefore, gain of the variable gain control circuit 150 decreases. On the other hand, when the detection output of the leakage flux detection coil 137 increases, the operational amplifier 156 outputs a positive voltage which is supplied to the gain control input terminal 150b of the variable gain control circuit 150. Therefore, gain of the variable gain control circuit 150 increases.

As described, according to the slant of the front face of the core 144 (145) of the head H with respect to the outer peripheral surface of the rotary magnetic cylinder member 9, the magnitude of exciting current supplied to the exciting coil 139 of the bias magnetic field generating head H is controlled by the closed loop, automatic control circuit such that the magnetic field strength between the front face of the core 144 (145) of the bias magnetic field generating head H and the outer peripheral surface of the rotary magnetic cylinder member 9 is automatically maintained at constant value.

As described in detail, according to the present invention, the bias magnetic field generator for use in a magnetic recording medium copying machine can electrically regulate a bias magnetic field strength such that it becomes uniform in the width direction of the magnetic recording medium, by running a master recording medium and a slave recording medium having a magnetic surface in intimate contact with a magnetic surface of the master recording medium with rotation of a rotary magnetic cylinder member while being made in pressure-contact, by means of compressed air, with an outer peripheral surface of the rotary magnetic cylinder member at least an outer peripheral surface portion of which is of high permeability material, by constituting a bias magnetic field generating head with a core member having a wide face in proximity to the contacting portion of the outer peripheral surface of the rotary magnetic cylinder member with the magnetic recording media at a position remote in peripheral direction from a main magnetic pole of the magnetic head by a distance substantially larger than a minimum distance between the outer peripheral surface of the rotary magnetic cylinder member and the top end portion of the main magnetic pole, the wide face being narrow in the magnetic recording media running direction and extending throughout the width of the magnetic recording media, a coil portion core magnetically coupled to the core member and having a branched pole constituting portion in the vicinity of its top end portion to branch magnetic flux in the core member to two flux paths and exciting coils mounted on the branched coil portion core and supplied with exciting current from two magnetomotive force supply device, separately, to generate magnetomotive force therein and by changing amplitudes of bias currents supplied to the exciting coils by the two magnetomotive force supply device by an automatic control operation of a closed automatic control circuit according to an amount of leakage flux detected by leakage flux detection device for separately detecting leakage flux in the direction of the outer surface of the rotary magnetic cylinder member from opposite ends of the main magnetic pole. Therefore, according to the present invention, the problems of the conventional bias magnetic field generator, that is, the high precision machining and assembling operations for the magnetic head and the slide base mechanism for moving a pressure contact portion including the magnetic head, required in the magnetic head having a single magnetic pole for generating a magnetic field including effective vertical field component as a major portion, and difficulty of maintaining a normal tilting state of the head due to small dynamic change of exhausting path for compressed air caused by variation of thickness of the magnetic recording media, etc., in intimately contacting them to the outer peripheral surface of the rotary magnetic cylinder member by means of compressed air even if the bias magnetic field generator is assembled with required precision, are solved since, in the present invention, it is easy to obtain a stable magnetic field distribution characteristics by means of the electrical tilt control device, without necessity of complicated mechanical tilt regulation. Thus, the bias magnetic field generator of the present invention can generate a stable bias magnetic field which is uniform in the width direction of the magnetic recording medium, with easy maintenance.

FIG. 15 is a graph of an experimental result showing a relation between a magnetic field strength of a transfer magnetic field externally supplied as transfer energy and a transfer quality of a magnetic recording information transferred from a master tape having a magnetic alloy film having coercive force of 2000 oersted to a slave tape having a magnetic film of iron oxide having coercive force of 680 oersted, in which abscissa depicts field strength of the transfer magnetic field given externally as the transfer energy expressed by magnetomotive force given to the transfer bias magnetic field generating head and ordinate depicts a transfer amplitude level which provides major influence to the transfer quality of the magnetic recording information to be transferred to the slave tape. In the result of experiment shown in FIG. 15, it has been proved by simulation that the relation between the transfer bias magnetic field strength and the magnetomotive force given to the bias magnetic field generating head is 1000 oersted/40 AT.

In the result shown in FIG. 15, maximum value of the transfer amplitude (point α in FIG. 15) is at 45 AT of magnetomotive force given to the bias magnetic field generating head. Although the transfer amplitude level gradually increases with increase of the magnetomotive force, there is no increase of transfer amplitude level after it reaches a predetermined value, even if the magnetomotive force is increased further. Rather, it tends to decrease with increase of the magnetomotive force. This fact explains the reason for that the field strength of the transfer bias field must be larger than the coercive force of the slave magnetic recording medium to which the magnetic recording information is to be transferred and smaller than that of the master magnetic recording medium.

That is, from the graph in FIG. 15, the transfer amplitude level value is confirmed when the bias magnetic field strength generated by the bias magnetic field generating head becomes larger than 680 oersted which is the coercive force of the slave magnetic recording medium. This fact is due to the hysteresis characteristics of the magnetic recording medium. Then, when the transfer bias magnetic field strength is gradually increased beyond 680 oersted which is coercive force of the slave magnetic recording medium, the transfer amplitude level is also gradually increased. When coercive force of the master magnetic recording medium is not sufficiently high, demagnetization of the master magnetic recording medium is started by the transfer bias magnetic field. Therefore, there is a transfer bias magnetic field strength which is optimum for generation of the maximum transfer amplitude level (point α in FIG. 15) of the slave magnetic recording medium. Thus, it is necessary for the bias magnetic field generating head to generate magnetomotive force optimum for generation of transfer bias magnetic field having the above mentioned optimum field strength.

When a master magnetic recording medium and a slave magnetic recording medium having a magnetic surface faced to a magnetic surface of the master magnetic recording medium are made in pressure-contact with an outer peripheral surface of a rotary magnetic cylinder member 9 mentioned with respect to FIG. 3 by compressed air jet jetted from the nozzles 21 and 22 provided in the vicinity of the main magnetic pole 19 of the transfer bias magnetic field generating head composed of the main magnetic pole 19 and the core member 20 both of which are mounted on the head mounting member 15 and the master and slave magnetic recording media are run along with rotation of the rotary cylinder member 9, the magnetically recorded information on the master magnetic recording medium is transferred onto the slave magnetic recording medium while they are passing through the vertical component of the bias magnetic field generated in the vicinity of the main magnetic pole 19 and having a single peak characteristics.

The single peaked transfer bias magnetic field generated by the bias magnetic field generating head according to the first embodiment shown in FIG. 3 has a strong vertical component and a small horizontal component. Therefore, when an information transfer is performed by using the bias magnetic field, demagnetization of the master magnetic recording medium may be smaller than in a case of information transfer by using twin peaked bias magnetic field generated by the bias magnetic field generating head according to the first embodiment of the present invention mentioned with respect to FIG. 1.

In the bias magnetic field generator of the transfer system of the first embodiment described with reference to FIG. 3, the output signal of the flux detection coil 24 provided in the vicinity of the main magnetic pole 19 of the bias magnetic field generating head is automatically controlled by the closed automatic control circuit such that its value becomes the predetermined reference value to thereby make the transfer magnetic field strength constant. Therefore, even when the distance g between the top end portion of the main magnetic pole 19 and the outer surface of the rotary magnetic cylinder member 9 is varied for some reason, a bias current is supplied from the bias current supply circuit to the exciting coil 23 wound on the magnetic path between the main magnetic pole 19 and the core member 20 to thereby make the bias magnetic field strength constant.

In the bias magnetic field generator of the transfer system of the first embodiment described with reference to FIG. 3, since the single peaked transfer bias magnetic field generated in the gap portion between the single main magnetic pole 19 and the outer peripheral surface of the rotary magnetic cylinder member 9 has a strong vertical component and a small horizontal component, influence of demagnetization of the master magnetic recording medium which is important in the first embodiment mentioned with respect to FIG. 1 can be ignored and further the effect that the output signal of the flux detection coil 24 provided in the vicinity of the main magnetic pole 19 of the bias magnetic field generating head is automatically controlled by the closed automatic control circuit such that its value becomes the predetermined reference value to thereby make the transfer magnetic field strength constant can be obtained. However, when the top end of the single main magnetic pole 19 is not in parallel to the center axis of the rotary magnetic cylinder member 9, that is, when the top end of the single main magnetic pole 19 is slanted with respect to the generatrix of the rotary magnetic cylinder member 9, there may be considerable unevenness of transfer amplitude level generated in the width direction of the recording medium.

This problem will be described with reference to FIG. 14. In FIG. 14, MD depicts a magnetic drum which may correspond to the drum 5 of soft magnetic material shown in FIG. 1 or the rotary magnetic cylinder member 9 in FIG. 3 and MP depicts a magnetic pole of the bias magnetic field generating head, which may correspond to the magnetic pole of the C type head shown in FIG. 1 or the main magnetic pole 19 in FIG. 3. Since, as mentioned previously, there is a bias magnetic field strength optimum for generating a maximum value of the transfer amplitude level of the slave tape, it is necessary to generate magnetic field having such optimum field strength throughout the width of the tape.

In order to make the strength of the bias magnetic field generated in the gap provided between the magnetic pole MP and the outer peripheral surface of the magnetic drum MD constant, the gap must be uniform in an extension of the magnetic pole MP.

When the magnetic pole MP is tilted with respect to the outer peripheral surface of the magnetic drum MD, the distance between the surface of the magnetic pole MP and the outer peripheral surface of the magnetic drum MD is varied such that it is g1 at one end of the magnetic pole MP and g2 at the other end thereof. A graph shown in FIG. 14 shows strength of the vertical magnetic field component at a position P remote from the outer peripheral surface of the drum MD by a predetermined distance when the magnetic pole MP is tilted with respect to the outer peripheral surface of the magnetic drum MD. In FIG. 14, a chain line curve B shows characteristics when the magnetic pole MP is the main magnetic pole 19 in FIG. 3 and the magnetic drum MD is the rotary magnetic cylinder member 9 in FIG. 3 and a dotted line curve C in FIG. 14 shows characteristics when the magnetic pole MP is the magnetic pole of the C type head shown in FIG. 1 and the magnetic drum MD is the drum of soft magnetic material in FIG. 1. Another chain line A in FIG. 14 indicates a center position in the Z direction in the transfer bias magnetic field.

When the magnetic pole MP is tilted with respect to the outer peripheral surface of the magnetic drum MD, the magnetic field strength in the gap between the magnetic pole MP and the outer peripheral surface of the magnetic drum MD is varied in the extension of the magnetic pole MP (Z direction) as shown by the curves B and C in FIG. 14.

The characteristics curves B and C in FIG. 14 clearly show that the bias magnetic field strength in the width direction of the tape in the head having the single main magnetic pole 19 shown in FIG. 3 is more influenced by the slant of the magnetic pole MP than in the case of the C type head in FIG. 1.

That is, in the case of the C type head mentioned with respect to FIG. 1, since flux passes through the magnetic gap of the C type head itself even if the distance between the magnetic pole MP and the outer peripheral surface of the magnetic drum MD is increased to g2 and hence magnetic resistance in the gap is increased, flux passed back through the narrow gap g1 does not increase so much as shown by the curve C in FIG. 14. On the other hand, in the case of the head having the single main magnetic pole 19 shown in FIG. 3, the head itself has no magnetic gap and flux emanating from the magnetic pole MP returns thereto through the gap g1 necessarily. Therefore, when the distance between the magnetic pole MP and the outer peripheral surface of the magnetic drum MD is increased to g2 and hence magnetic resistance in the gap is increased, an amount of magnetic flux passing through the gap g1 increases as shown by the curve B in FIG. 14.

In the case where the maximum strength of the magnetic field is made constant, a rate of reduction of magnetic field strength in a portion whose magnetic resistance is increased due to the slant of the magnetic pole with respect to the drum MD is larger for the head having the single main magnetic pole 19 shown in FIG. 3 than for the C type head shown in FIG. 1, as clearly shown by the curves B and C.

As mentioned, although, in the head having the single main magnetic pole 19 shown in FIG. 3, there is the merit that the transfer bias magnetic field having shape vertical magnetic field component is obtainable, the transfer amplitude level in the width direction of the tape is considerably changed by tile slant of the magnetic pole 19. Therefore, the magnetic head must be machined and assembled with very high precision.

Figure 17:
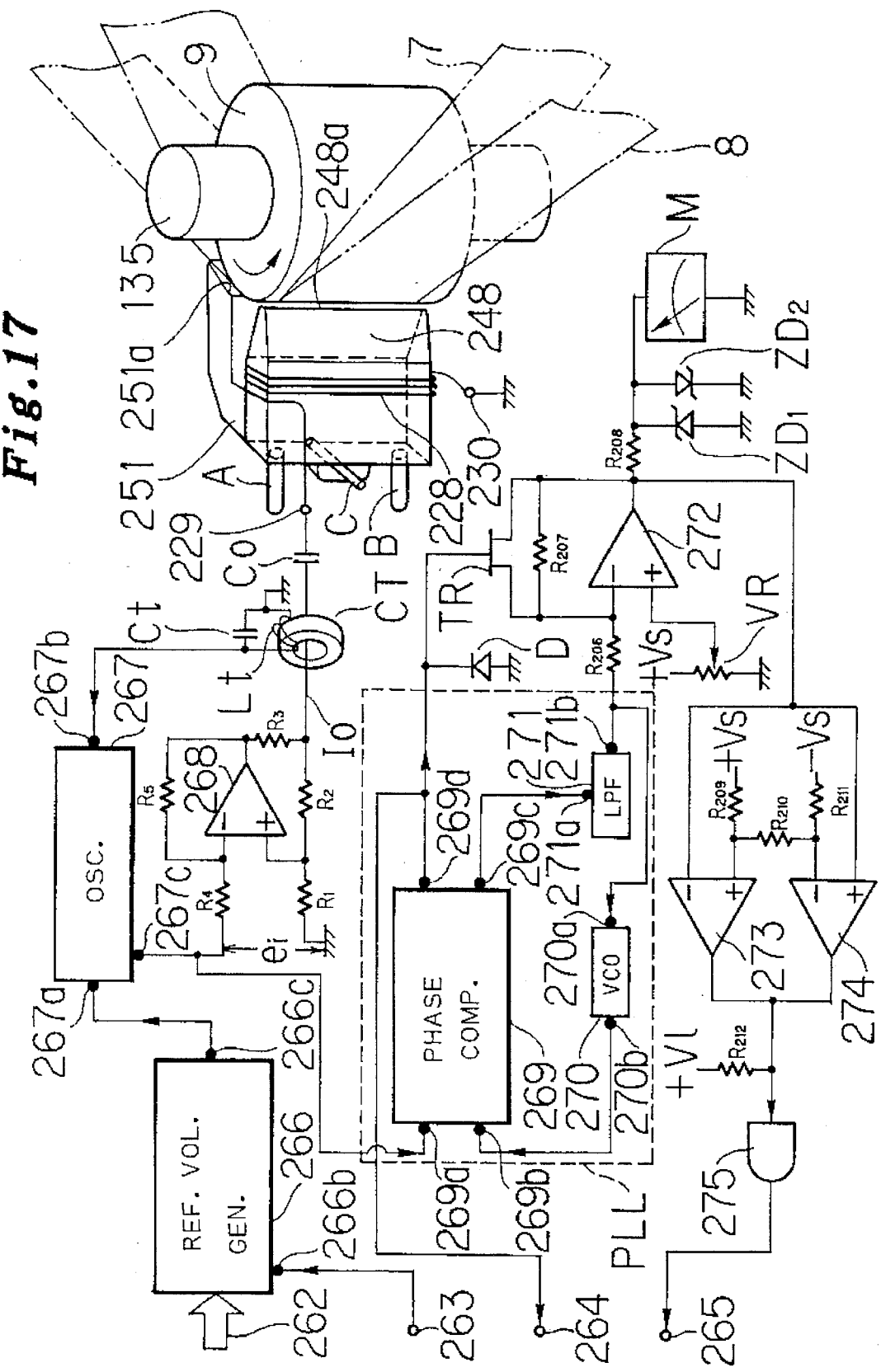
FIG. 17 is a block diagram showing a construction of a bias magnetic field generator according to a fourth embodiment of the present invention.
Figure 18:
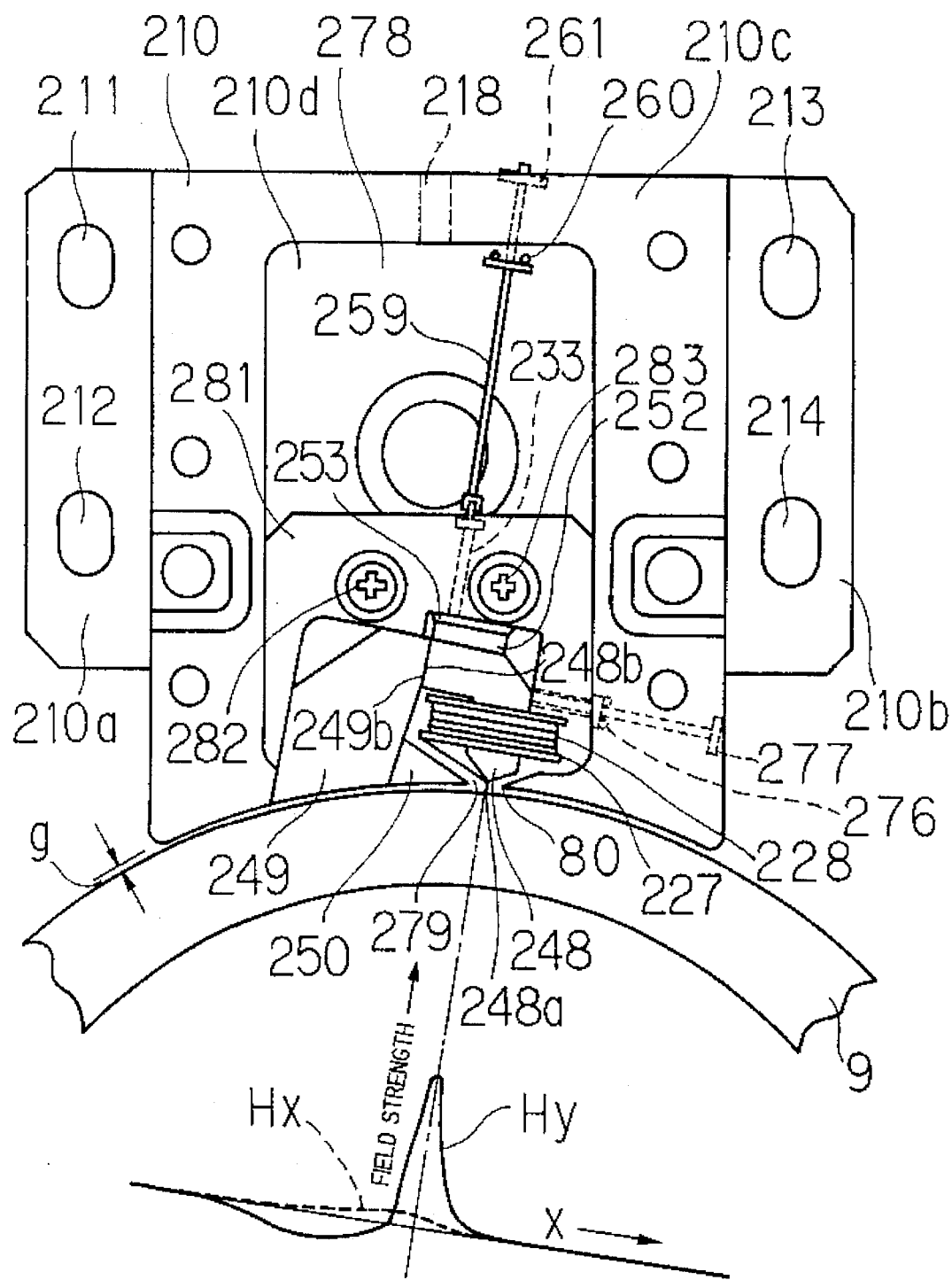
FIG. 18 is a plan view of a portion of a bias field generator according to the fourth embodiment of the present invention.
Figure 20:
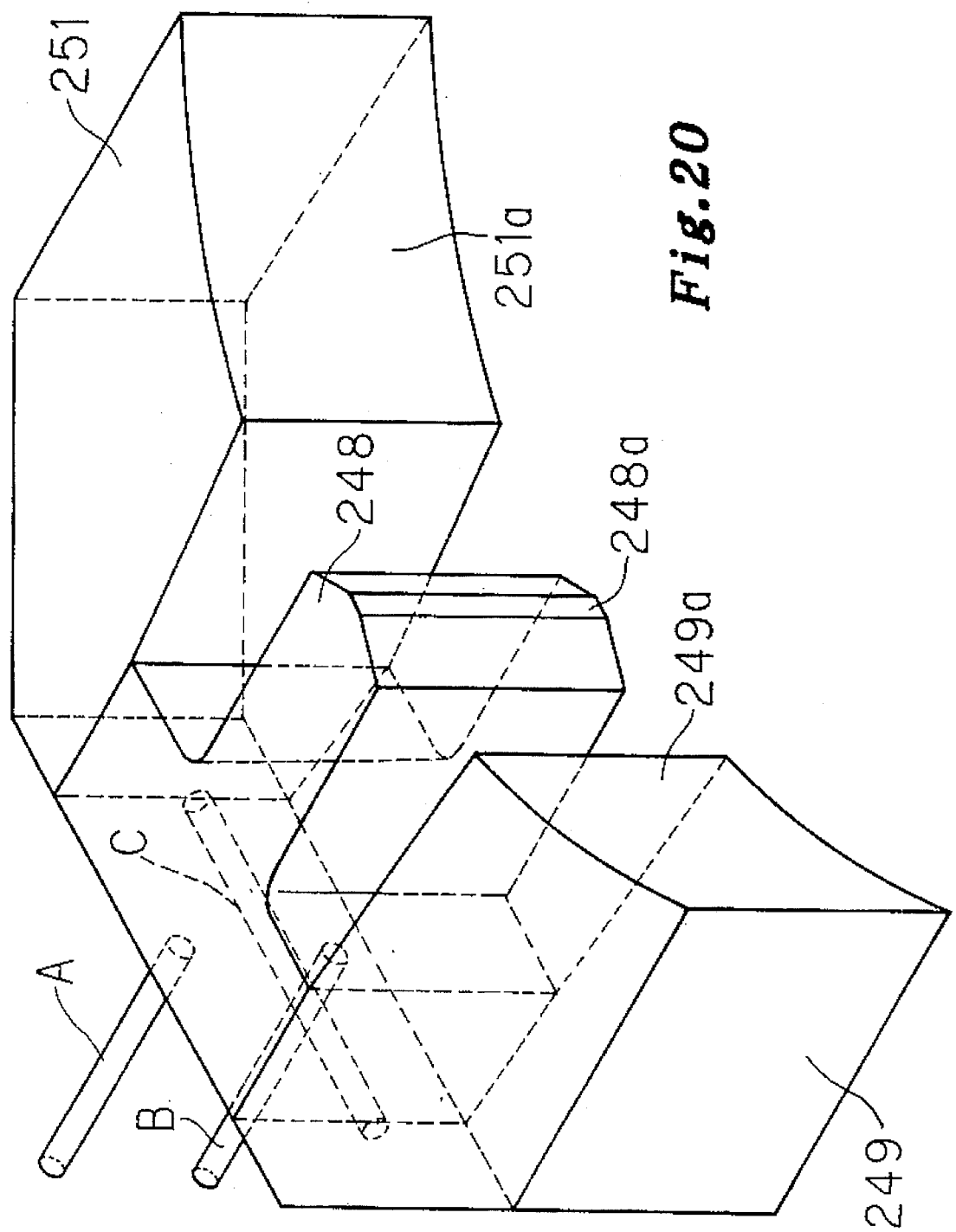
FIG. 20 is a perspective view of a core portion of the bias magnetic field generating head used in the bias magnetic field generator according to the fourth embodiment.
Figure 21:
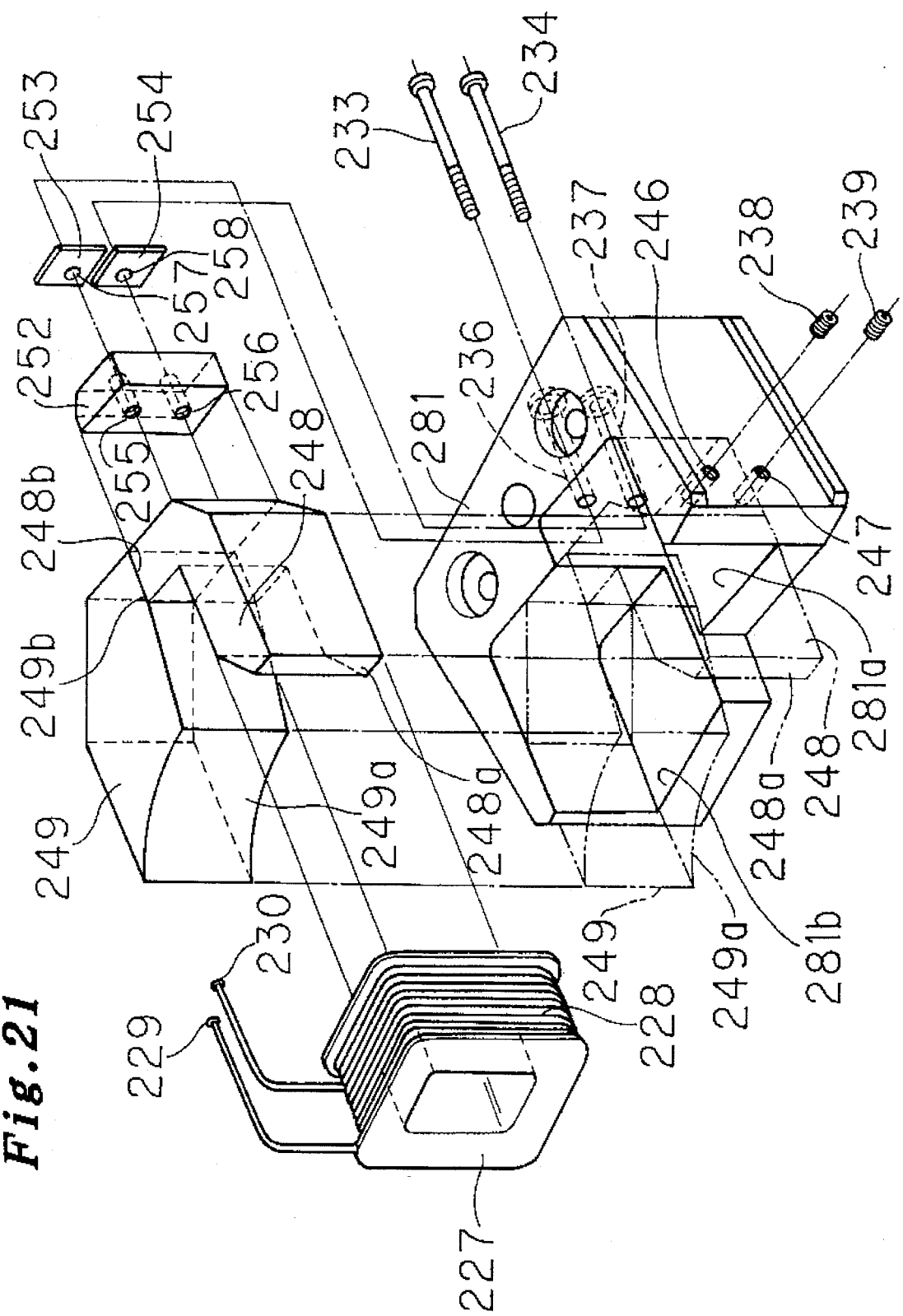
FIG. 21 is a perspective view of a core structure of the bias magnetic field generating head used in the bias magnetic field generator according to the fourth embodiment.
Figure 22:
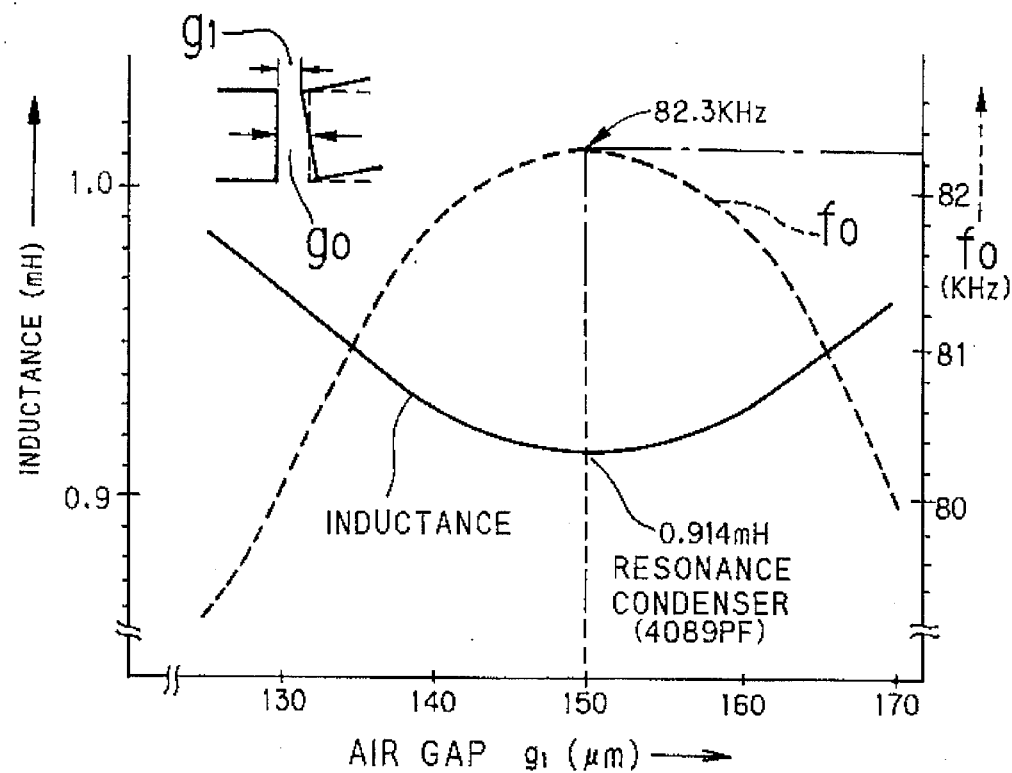
FIG. 22 is a graph showing a variation characteristics of an inductance of an exciting coil with respect to variation of distance between the main magnetic pole and the outer peripheral surface of the rotary magnetic cylinder member and a variation characteristics of resonance frequency of an exciting coil circuit, which are useful in explaining a constructive and operational principles of the fourth embodiment of the present invention.
Figure 23:
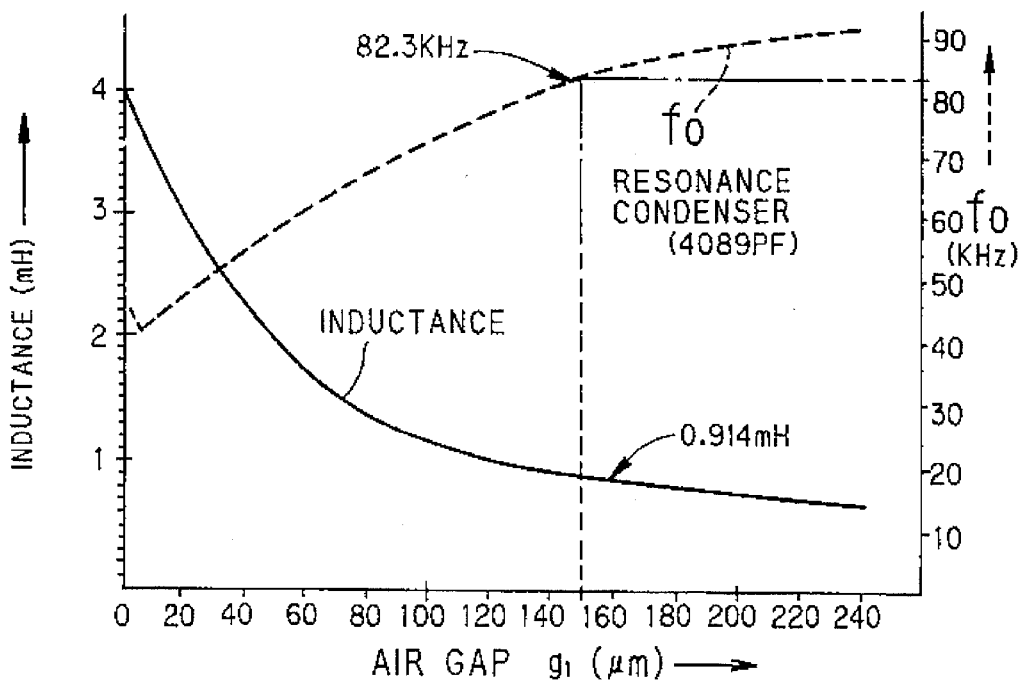
FIG. 23 is a graph showing another variation characteristics of an inductance of an exciting coil with respect to variation of distance between the main magnetic pole and the outer peripheral surface of the rotary magnetic cylinder member and another variation characteristics of resonance frequency of an exciting coil circuit, which are useful in explaining a constructive and operational principles of the fourth embodiment of the present invention.

Now, a fourth embodiment of the present invention will be described with reference to FIGS. 17 to 23 together with FIGS. 1 3, 7, 10 and 11 which were used previously. FIG. 17 is a block diagram showing a construction of the transfer bias magnetic field generator of the present invention, FIG. 18 is a plan view of the transfer bias magnetic field generator of the present invention, FIGS. 19 and 20 are perspective views of cores of bias magnetic field generating heads of the bias magnetic field generator of the present invention, FIG. 21 is a disassembled perspective view of an example of the bias magnetic field generating head of the present invention, FIGS. 22 and 23 are graphs showing a variation of inductance of an exciting coil and a variation of resonance frequency of an exciting coil circuit with respect to variation of gap between a main magnetic head and an outer peripheral surface of a rotary magnetic cylinder member, respectively, FIGS. 14 and 15 are graphs showing strength of the vertical magnetic field component at a position P remote from the outer peripheral surface of the drum MD and an experimental result showing a relation between a magnetic field strength of a transfer magnetic field externally supplied as transfer energy and a transfer quality of a magnetic recording information, respectively, as mentioned previously, FIGS. 10(*a*) and 10(*b*) show a magnetic field strength distribution characteristics useful in explaining a constructive arid operational principles of the present invention, as mentioned previously, FIGS. 11(*a*) and 11(*b*) show another magnetic field strength distribution characteristics useful in explaining a constructive and operational principles of the present invention, as mentioned previously, FIG. 7 is a perspective view of a core structure of a bias magnetic field generating head used in the bias magnetic field generator of the present invention, as mentioned previously, FIG. 3 is a plan view of a portion of a bias field generator according to the present invention, as mentioned previously and FIG. 1 is a plan view of a conventional bias magnetic field generator to be used in a magnetic information recording apparatus.

In an upper right portion of FIG. 17 which shows a transfer bias magnetic field generator according to the fourth embodiment of the present invention, a rotary magnetic cylinder member 9 driven by a rotary shaft 135, magnetic recording media 7 and 8 which are made pressure contact with a portion of an outer peripheral surface of the rotary magnetic cylinder member 9 and a portion of a transfer bias magnetic field generating head for applying a transfer bias magnetic field to the pressure contact portion in a width direction of the media are shown. The magnetic head shown in FIG. 17 is a head having a core such as shown in FIG. 19.

Figure 19:
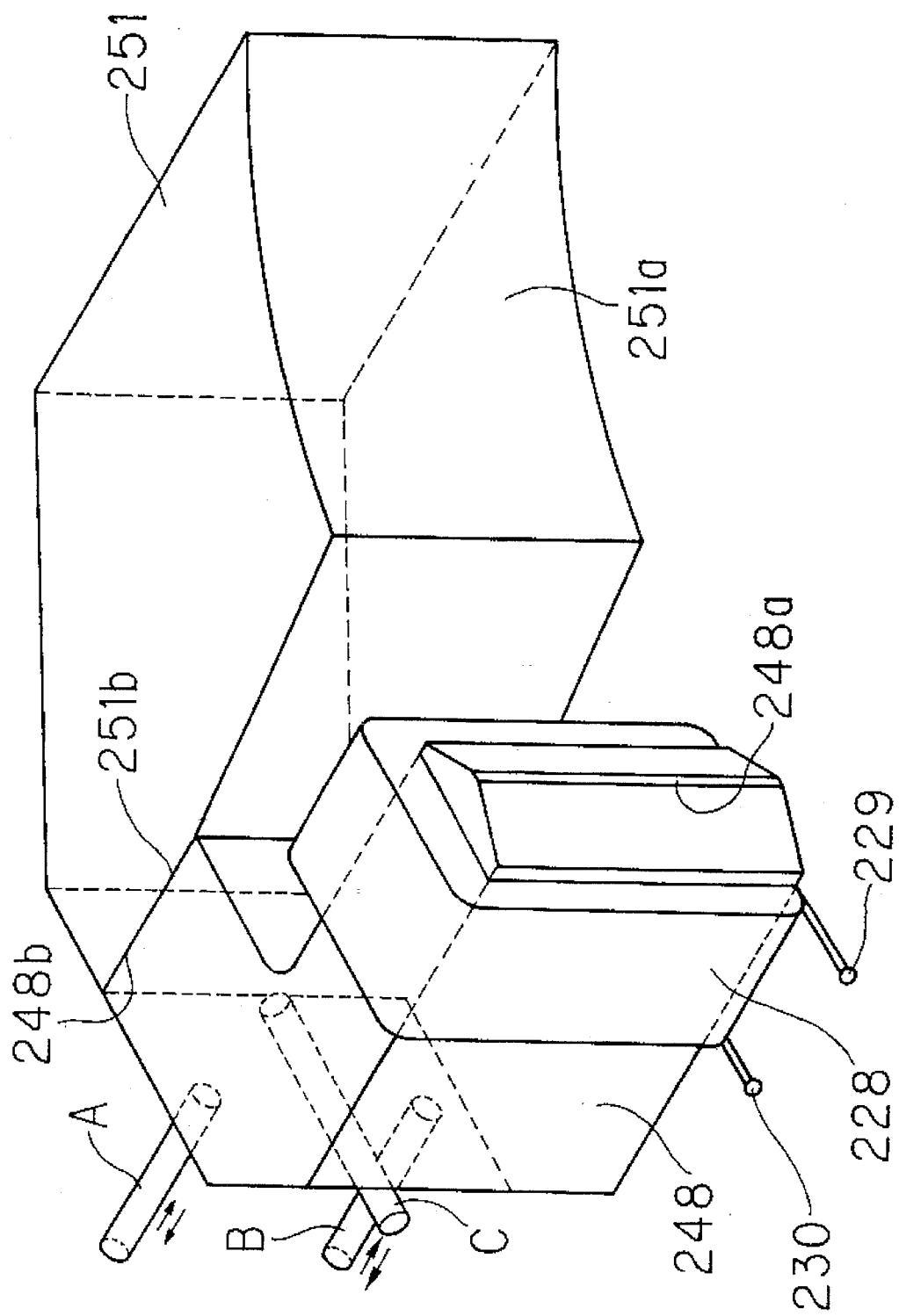
FIG. 19 is a perspective view of a core structure of a bias magnetic field generating head used in the bias magnetic field generator according to the fourth embodiment.

In FIG. 19 which shows a construction of the core of the present bias magnetic field generating head, a reference numeral 248 depicts a core member including a main magnetic pole for generating bias magnetic field, 251 a core member having a curved face 251*a* and 228 an exciting coil. A main magnetic pole is provided at a top end portion of the core member 248. The main magnetic pole has a top end which is narrow in a running direction of a master tape 7 and a slave tape 8 which are pressed, with magnetic surfaces thereof being in intimate contact with each other, to a portion of an outer peripheral surface of a rotary magnetic cylinder member 9 and extends throughout the width of the tapes in the width direction thereof. At least an outer peripheral portion of the rotary magnetic cylinder member 9 is made of high permeability material. The top end face of the main magnetic pole is depicted by 248*a* in FIG. 19.

The core member 251 is separated from the main magnetic pole by a distance substantially larger than a gap between the top end face 248*a* of the main magnetic pole and the outer peripheral surface of the rotary magnetic cylinder member 9 in a state where the top end face 248*a* is arranged in the vicinity of the portion of the outer peripheral surface of the rotary magnetic cylinder member 9 to which the magnetic recording media 7 and 8 are pressed, with a predetermined gap therebetween and the curved face 251*a* of the core member 251 being faced to a large area of the outer peripheral surface of the rotary magnetic cylinder member 9, as shown in FIG. 17. The core member 248 and the core member 251 are prepared separately and magnetically coupled to each other by mutually contacting side faces 248*b* and 251*b* of their root portions.

A single exciting coil 228 is wound on the core member 248 so that a transfer bias magnetic field can be applied from the top end portion of the main pole to the pressure contact portion of the outer peripheral surface of the rotary magnetic cylinder member 9 and the magnetic recording media in the width direction of the recording media by magnetomotive force generated by the exciting coil 228. The core member 248 is movable such that, in a state where the core members 248 and 251 are magnetically coupled by the contact of the side faces 248*b* and 251*b* thereof, a tilt angle of a cross line between a specific one of planes containing a center line of the drum 9 and the top end face 248*a* of the core member 248 can be changed within a predetermined angular range.

The core members 248 and 251 shown in FIG. 19 are magnetically coupled to each other by the contact between the side faces 248*b* and 251*b* thereof, as mentioned above. In FIG. 20, however, a side face of the core 251 is connected to one side face of the root portion of the core 248 to magnetically couple the cores 248 and 251 and a side face of another core member 249 having curved face 249*a* is connected to the other side face of the core 248 to magnetically couple the cores 248 and 249.

In FIGS. 19 and 20, the core 251 (249) having the curved face is fixedly secured to a magnetic head holder 281 to be described later with reference to FIG. 21. The core member 248 magnetically coupled to the core member 251 (249) is movably held by the magnetic head holder 281 as the movable core member such that the tilt angle of the cross line between the specific one of planes containing the center line of the rotary magnetic cylinder member 9 and the top end face of the main magnetic pole can be changed within the predetermined angular range.

The top end face of the main pole provided on the core member 248 can be regulated such that it becomes in parallel to the outer peripheral surface of the rotary magnetic cylinder member 9. The regulation is achieved by a shift regulation mechanism constituted with screws 233 and 234 having fine pitch and screw holes formed in a rear wall of the magnetic head holder 281 at positions separated in a direction parallel to the center axis direction of the rotary magnetic cylinder member 9.

A capital letter C in FIGS. 19 or 20 depicts a pivot point of the core 248 and capital letters A and B in the same figure depict the shift regulation mechanism for the core member 248. The shift regulation mechanism may be any other than the combination of the screw holes formed in the rear wall of the magnetic head holder 281 and the fine pitch screws 233 and 234.

FIG. 21 is a disassembled perspective view of the magnetic field generating head to be mounted on the magnetic head holder 281. The head includes, in addition to the core member 248 with the exciting coil 228 mounted thereon as shown in FIG. 19, the magnetic head holder 281. FIG. 18 is a plan view of the bias magnetic field generator constituted with the magnetic head shown in FIG. 21.

The horizontal arrangement of the core shown in FIGS. 21 and 18 is reversed with respect to the arrangement of the core member 248 and the core member having the curved face shown in FIG. 19. This corresponds to a case where the core is constituted with only the core member 248 and the core member 249 having the curved face with the core member having the curved face 251a being removed from the head shown in FIG. 20. Thus, the core of the bias magnetic field generating head constituted with only the core member 248 and the core member 249 having the curved face is shown in FIGS. 21 and 18.

A concrete example of the bias magnetic field generating head used in the fourth embodiment of the b;as magnetic field generator of the present invention will be described with reference to FIGS. 18 and 21. In FIG. 18, the rotary magnetic cylinder member 9 may take in the form of an annular drum of, for example, sintered ferrite exhibiting high permeability. In FIGS. 18 and 21, a reference numeral 210 depicts a head block mounting member which is fixedly secured to a predetermined mounting portion of the transfer system by means of a mounting piece 210a having holes 211 and 212 and a mounting piece 210b having holes 213 and 214. The magnetic head holder 281 is fixedly secured to a recess 210d formed in the head block mounting member 210 by screws 282 and 283. The recess 210d provided in the head block mounting member 210 constitutes a pressurized-air chamber 278 together with a cover plate (not shown) on an upper face 210c of the head block mounting member 210, into which compressed-air is supplied through compressed-air inlet hole 218 provided in a rear wall of the head block mounting member 210.

Compressed-air supplied to the pressurized-air chamber 278 formed by the recess 210d of the head block mounting member 210 is jetted out through a compressed air jet nozzle 279 provided between the top end portion of the core member 248 held in the magnetic head holder 281 and the top end portion of a nozzle member 250 which is of non magnetic material and fixedly secured to the core member 249 having the curved face and a compressed air jet nozzle 280 provided in the top end portion of the core member 248 in an opposite side to the side of the jet nozzle 279.

Compressed air jetted from the jet nozzles 279 and 280 causes the master and slave magnetic recording media having magnetic surfaces faced to each other to be pressed to the outer peripheral surface of the rotary magnetic cylinder member 9 in the vicinity of the top end portion of the main magnetic pole of the bias magnetic field generating head, The core member 249 having the curved face 249a is fixedly secured to the magnetic head holder 281, The core member 248 which is provided separately from the core member 249 and functions as the movable core member which makes possible to change the tilt angle of the cross line between the specific one of planes containing the center line of the rotary magnetic cylinder member 9 and the top end face 248a of the main magnetic pole within the predetermined angular range is movably held by the magnetic head holder 281.

In the bias magnetic field generating head having the structure shown in FIGS. 18 and 21, a bobbin 227 having the exciting coil 228 thereon is mounted on the core member 248 and, by supplying exciting current to the exciting coil 228, a transfer bias magnetic field generated between the main pole and the outer peripheral surface of the rotary magnetic cylinder member 9 by the main magnetic pole portion of the bias magnetic field generating head is applied to the portion of the outer peripheral surface of the rotary magnetic cylinder member 9 to which the master and slave magnetic recording media 7 and 8 are pressed.

The core member 248 movably supported by the magnetic head holder 281 can be regulated by the shift regulation mechanism constituted with the screws 233 and 234 having fine pitch, the screw holes formed in a rear wall of the magnetic head holder 281 at positions separated in a direction parallel to the center axis direction of the drum and constitutional components with which top end portions of the screws 233 and 234 are in thread engagement such that the tilt angle of the top end face 248a of the core member 248 with respect to the center line of the rotary magnetic cylinder member 9 can be changed within the predetermined angular range.

Another shift regulation mechanism usable in the present invention will be described. After the core member 249 having the curved face 249a is inserted into a space portion on the face 281b of the magnetic head holder 281 shown in FIGS. 18 and 21, the face 281b is fixed to a bottom face of the core member 249 by suitable adhesive.

Further, after a slant drive member 252 of non magnetic material is fixed to a rear face of the core member 248 by an adhesive, the core member 248 and the core member 249 with side faces 248b and 249b of root portions thereof being magnetically coupled are arranged in the space above the face 281a of the magnetic head holder 281 rotatably in clockwise or counterclockwise direction about an imaginary rotary axis orthogonal to these contacting faces 248b and 249b.

The slant drive member 252 of non magnetic material fixed to the read end face of the core member 248 is formed with a pair of screw holes (female threaded) 255 and 256 with a vertical space therebetween. The holes 255 and 256 are aligned with holes 236 and 237 formed in the magnetic had holder 281 and holes 257 and 258 formed in respective buffer members 253 and 254 and the core member 248 is mounted on the magnetic head holder 281 by inserting the screws 233 and 234 into the two aligned holes and tightening them. By adjusting the tightening of the screws 233 and 234, relatively, the core member 248 and the core member 249 with side-faces 248b and 249b of root portions thereof being magnetically coupled are rotated in clockwise or counterclockwise direction about the imaginary rotary axis orthogonal to these contacting faces 248b and 249b, so that it is possible to change the tilt angle of the top end face 248a of the core member 248 with respect to the center line of the rotary magnetic cylinder member 9 within the predetermined angular range.

The core member 248 whose slant depends upon tightening degree of the screws 233 and 234 is held in the magnetic head holder 281 provided in the recess 210d of the head block mounting member 210 and the magnetic head holder 281, when the cover plate (not shown) is fixedly secured to the upper face 210c of the head block mounting member 210, forms the air chamber communicated with the air chamber 278 to which compressed air is supplied through the compressed air inlet hole 218 provided in the rear wall of the head block mounting member 210, as mentioned above. Therefore, the screws 233 and 234 can not be directly regulated after the cover plate is fixed to the upper face 210c of the head block mounting member 210.

In order to regulate the screws 233 and 234 inserted into the holes 236 and 237 formed in the magnetic head holder 281 to thereby change the slant angle of the top end face 248a of the core member 248 with respect to the center line of the rotary magnetic cylinder member 9 within the predetermined angular range under this condition, there must be provided a mechanism for rotating the screws 233 and 234 within the air chamber 278, externally of the head block mounting member 210.

A rotation transmitting member 259 shown in FIG. 18 is a portion of the screw rotating mechanism mentioned above. The rotation transmitting member 259 is connected to a rotation regulating member 261 protruding externally from the head block mounting member 210 through an air seal member 260.

When the rotation regulating member 261 is rotated for regulation, the rotation of the rotation regulating member 261 is transmitted through the rotation transmitting member 259 within the air chamber 278 of the head block mounting member 210 sealed by the seal member 260 to the screws 233 and 234. Therefore, the core member 248 of the main magnetic pole movably supported by the magnetic head holder 281 can be regulated through a shift regulating mechanism for converting rotation of the screws 233 and 234 into linear movement such that the top end face 248a thereof becomes in parallel to the surface of the rotary magnetic cylinder member 9.

After the face 248a of the core member 248 is made parallel to the surface of the rotary magnetic cylinder member 9 through the use of the above mentioned mechanisms, the core member 248 is fixed in position by screwing the screws 238 and 239 into the screw holes 246 and 247 provided in the side wall of the magnetic head holder 281 as shown in FIG. 21. The parallelism of the top end face 248a of the core member 248 with respect to the surface of the rotary magnetic cylinder member 9 can be easily known by indicator device to be described later.

There are provided around the side wall portions of magnetic head holder 281 and the head block mounting member 210 a rotation transmitting member which is similar to the rotation transmitting member 259 and a seal member 276 which is similar to the seal member 260. The regulation of tightening of the screws 238 and 239 inserted into the screw holes 246 and 247 of the magnetic head holder 281 is performed through a rotation regulating member 277 similar to the rotation regulating member 261.

In order to separately rotate the screws 233 and 234 through the rotation transmitting member 259 within the air chamber 278 of the head block mounting member 210 which is sealed by the seal member 260, by rotating the rotation regulating member 261 protruding from the head block mounting member 210, the mechanism including the rotation regulating member, the seal member and the rotation transmitting member must be provided for each of these screws. Therefore, the construction of the bias magnetic field generator becomes complicated.

Therefore, if it is possible to make rotatable in clockwise or counterclockwise direction about the imaginary rotation axis orthogonal to the contact plane of the side faces 248b and 249b of the core members 248 and 249 by changing the tightening of only one, for example, 233, of the screws 233 and 234, it is enough to provide a single mechanism and thus the construction can be simplified.

In an example of a construction which can realize the above mentioned scheme, the buffer members 253 and 254 are made different in thickness and the screw penetrating the thinner buffer member, for example, 254, is not rotated. In another example, the buffer members 253 and 254 are different in stiffness and the screw penetrating the buffer member having larger stiffness is not rotated.

In the former example, it is possible to make rotatable in clockwise or counterclockwise direction about the imaginary rotation axis orthogonal to the contact plane of the side faces 248b and 249b of the core members 248 and 249 by regulating only the screw 233 penetrating the thicker buffer member 253 and, in the later example, it is possible to make rotatable in clockwise or counterclockwise direction about the imaginary rotation axis orthogonal to the contact plane of the side faces 248b and 249b of the core members 248 and 249 by regulating only the screw 233 having smaller stiffness and penetrating the thicker buffer member 253. The buffer members 253 and 254 may be made from a thin plate of silicon rubber.

In FIG. 17 which shows the bias magnetic field generator of the present invention, a reference numeral 266 depicts a reference voltage generator circuit to which a magnetic field strength setting data 262 for setting the generated field strength to a predetermined value is supplied externally. The field strength setting data 262 may be a BCD digital data. When the reference voltage generator circuit 266 is supplied with a field generating signal 266b from a field generation/stop signal input 263, it generates a D.C. voltage (for example, 2000 volts) corresponding to the supplied field strength setting data and outputs it at the output terminal 266c. The D.C. voltage is supplied to the input terminal 267a of the oscillator circuit 267 as a D.C. control voltage, upon which oscillation of the oscillator circuit 267 whose start of oscillation will be described later continues by a positive feedback signal supplied through the secondary circuit of the current transformer CT to the trigger input terminal 267b to provide at its output terminal 267c a constant oscillation output voltage ei generated correspondingly to the D.C. control voltage supplied to the input terminal 267a.

The output signal at the output terminal 267c of the oscillator circuit 267 is supplied through the resistor R4 to the inverted input terminal of the operational amplifier 268 and the input terminal 269a of the phase comparator circuit 269. The non-inverted input terminal of the operational amplifier 268 is connected to the junction between the resistors R1 and R2 and the resistor R5 is connected between the inverted input terminal and the output terminal of the operational amplifier circuit 268. Further, the resistor R3 is connected between the output terminal of the operational amplifier 268 and the resistor R2.

The circuit constant of the parallel resonance circuit composed of the detection coil Lt constituting the secondary circuit of the current transformer CT and the resonance capacitor Ct is determined such that its resonance frequency is substantially equal to the series resonance frequency determined by the inductance of the exciting coil 228 of the head and the resonance capacitor Co. Since the impedance of the parallel resonance circuit of the detection coil Lt and the resonance capacitor Ct is high in the resonance frequency range, the signal component of the resonance frequency range is positively fedback to the trigger input terminal 267b of the oscillator circuit 267.

In the initial state, the oscillator circuit 267 starts to oscillate by the positive feedback of the signal component having frequency in the resonance frequency range selected by the parallel resonance circuit composed of the detection coil Lt and the resonance capacitor Ct to the trigger input terminal 267b thereof. Oscillation output of the oscillator circuit 267 is amplified by the operational amplifier circuit 268 and supplied as oscillation current Io to the series resonance circuit composed of the inductance of the exciting coil 228 and the resonance capacitor Co. With the oscillation current Io flowing through the primary circuit of the current transformer CT, the parallel resonance circuit constituting the secondary circuit of the transformer CT is excited by the positive feedback of the signal component having frequency in the series resonance frequency determined by the series resonance circuit composed of the inductance of the exciting coil 228 and the resonance capacitor Co to the trigger input terminal 267b of the oscillator circuit 267 and oscillation of the oscillator circuit 267 at the predetermined frequency continues.

The circuit arrangement of the operational amplifier 268 and the resistors R1 to R5 mentioned previously is a constant current circuit called as bilateral circuit and circuit conditions thereof necessary for performing the constant current operation are R1=R4 and R5=R2+R3, under which a constant current Io=−ei·R5/R4 is obtained.

When the oscillation output (magnetizing signal) having voltage of ei is output at the output terminal 267c of the oscillator circuit 267, the constant output current Io is supplied from the output terminal of the operational amplifier circuit 265 through the resistor R3 to the series resonance circuit composed of the inductance of the exciting coil 228 and the resonance capacitor Co.

The phase comparator circuit 269 having the input terminal 269a connected to the output terminal 267c of the oscillation circuit 267 and another input terminal 269b connected to the output terminal 270b of the voltage controlled oscillator 270, a low-pass filter 271 having an input terminal 271a supplied with the analog output signal from the output terminal 269c of the phase comparator circuit 269 and the voltage controlled oscillator 270 having the input terminal 270a connected to the output terminal 271b of the low-pass filter 271 to receive the output signal of the filter as a frequency control voltage constitute a closed automatic phase control loop, that is, phase locked loop (PLL) and the logic output signal from the output terminal 269d of the phase comparator circuit 269 is supplied to the output terminal 264, a gate of a field effect transistor TR and a cathode of a diode D. The output signal from the output terminal 271b of the low-pass filter 271 is supplied through a resistor 206 to the inverted input terminal of the operational amplifier 272.

The non-inverted input terminal of the operational amplifier 272 is supplied with an offset regulation voltage set by a slider of a variable resistor VR connected between the ground and the positive voltage +Vs of the reference voltage source. A resistor R207 is connected between the output terminal and the inverted input terminal of the operational amplifier 272. A source of the field effect transistor TR is connected to the non-inverted input terminal of the operational amplifier 272. A drain of the field effect transistor TR is connected to one end of a resistor R208, a negative input terminal of the voltage comparator 273 and a positive input terminal of the voltage comparator 274. One end of an indicator M (for example, a moving coil amparemeter) is connected to the other end of the resistor R208 and to Zener diodes ZD1 and ZD2 connected in reverse polarity.

A resistor R210 is connected between the positive input terminal of the voltage comparator 273 and the negative input terminal of the voltage comparator 274. The positive input terminal of the voltage comparator 273 is connected through the resistor R209 to the positive voltage +Vs of the reference voltage source and the negative input terminal of the voltage comparator 274 is connected through a resistor R211 to the negative voltage −Vs of the reference voltage source. The output terminals of the voltage comparators 273 and 274 are commonly connected to an input of a logic buffer 275 and through a resistor R212 to a logic circuit power source voltage V1. An output of the logic buffer 275 is supplied to the output terminal 265.

As mentioned with reference to FIGS. 18 and 21, rotation of the rotation regulating member 261 is transmitted through the rotation transmitting member 259 within the air chamber 278 of the head block mounting member 210 sealed by the seal member 260 to the screws 233 and 234 as rotation regulating motion for the screws 233 and 234 upon which the core member 248 of the main magnetic pole movably supported by the magnetic head holder 281 can be regulated through a shift regulating mechanism for converting rotation of the screws 233 and 234 into linear movement such that the top end face 248a thereof becomes in parallel to the surface of the rotary magnetic cylinder member 9 and the parallelism of the top end face 248a of the core member 248 with respect to the surface of the rotary magnetic cylinder member 9 can be easily known by the indicator M.

The possibility of electrically detecting various information indicative of the positional relation between the top end face 248a of the core member 248 and the surface of the rotary magnetic cylinder member 9 will be described with reference to FIGS. 22 and 23. FIG. 23 is a graph showing a variation of inductance of the exciting coil and a variation of resonance frequency fo determined by the inductance of the exciting coil and the resonance capacitor Co (in the shown example, it has an electrostatic capacitance of 4089 pF) connected to the exciting coil, when the distance g between the top end face of the core member which has the exciting coil and in which the single pole head is constituted and the face of the rotary magnetic cylinder member 9 is changed while maintaining these faces in parallel.

FIG. 22 is a graph showing a variation of inductance of the exciting coil and a variation of resonance frequency fo determined by the inductance of the exciting coil and theresonance capacitor Co (in the shown example, it has an electrostatic capacitance of 4089 pF) connected to the exciting coil, when the distance between the top end face of the core member which has the exciting coil and in which the single pole head is constituted and the face of the rotary magnetic cylinder member 9 is set to a value go (in the shown example, go=150 μm) while maintaining these faces in parallel and then the minimum distance g1 therebetween is changed by slanting the top end face of the core member about a center position of the top face with respect to the face of the rotary magnetic cylinder member 9.

From FIGS. 22 and 23, it is clear that the inductance of the exciting coil and the series resonance frequency fo of the serial resonance circuit including the exciting coil are changed with different variations, respectively, correspondingly to the positional relation between the tip end face of the core member and the face of the rotary magnetic cylinder member. Therefore, it is possible to know the positional relation clearly by monitoring the series resonance frequency fo and the inductance of the exciting coil.

The phase comparator 269 of the phase locked loop functions as a frequency discriminator whose output signal corresponds to frequency variation of the input signal supplied to the input terminal 269*a* thereof and the low-pass filter 271 can output a signal corresponding to the frequency variation of the input signal supplied to the input terminal 269*a* of the phase comparator 269.

The output signal of the low-pass filter 271 is supplied through the resistor R206 to the operational amplifier 272 and the output of the amplifier is supplied through the resistor R208 to the indicator M to indicate the frequency variation of the input signal supplied to the input terminal 269*a* of the phase comparator circuit 269.

In order to make it possible to regulate the top end face 248*a* of the core member 248 such that it becomes in parallel to the outer peripheral surface of the rotary magnetic cylinder member 9, while monitoring a content of indication on the indicator M, it is enough to set the oscillation frequency (free-running frequency) of the voltage controlled oscillator 270 with no signal being supplied to the input terminal 269*a* of the phase comparator 269 of the phase locked loop to the series resonance frequency of the series resonance circuit composed of the exciting coil 228*b* and the resonance capacitor Co during the top end face 248*a* of the core member 248 and the outer peripheral surface of the rotary magnetic cylinder member 9 are in parallel.

The concrete example shown in FIGS. 22 and 23 will be described in detail. When the top end face 248*a* of the core member 248 and the outer peripheral surface of the rotary magnetic cylinder member 9 are in parallel to each other with the distance therebetween being 150 μm, the series resonance frequency of the series resonance circuit composed of the exciting coil 228 and the resonance capacitor Co is 82.3 KHz. Therefore, in this case, the free-running frequency of the voltage controlled oscillator 270 of the phase locked loop is set to 82.3 KHz.

Under this condition, the head block mounting member 210 which is separated from the position of the rotary magnetic cylinder member 9 by a considerable distance is shifted toward the outer peripheral surface of the rotary magnetic cylinder member 9 by a shifting mechanism such as slide base which is riot shown until the top end face 248*a* of the core member 248 provided on the head block mounting member 210 reaches a position remote from the outer peripheral surface of the rotary magnetic cylinder member 9 by a distance of 150 μm and then the core member 248 movably supported by the head holder 281 is regulated by the rotating regulating member 261 and the shift regulation member for converting rotation of the screws 233 and 234 into linear movement in such a way that the top end face 248*a* of the core member 248 and the outer peripheral surface of the rotary magnetic cylinder member 9 become in parallel, while the display content of the indicator M being monitored.

That is, when the head block mounting member 210 which is in the position remote from the position of the rotary magnetic cylinder member 9 is shifted toward the cylinder member 9 until the top end face 248*a* of the core member 248 reaches the position separated from the outer peripheral surface of the totally magnetic cylinder member 9 by 150 μm, the resonance frequency of the series resonance circuit composed of the exciting coil 228 and the resonance capacitor Co gradually decreases with decrease of the gap g between the top end face 248*a* and the outer peripheral surface of the rotary magnetic cylinder member 9 as shown by the curve fo in FIG. 23.

When it is detected by the display content of the indicator M that the series resonance frequency of the series resonance circuit composed of the exciting coil 228 and the resonance capacitor Co becomes 82.3 KHz, the shifting motion of the head block mounting member 210 by the shift mechanism such as slide base is stopped and then the core member 248 movably supported by the head holder 281 is regulated by the shift mechanism for converting rotation of the screws 233 and 234 into linear movement in such a way that the top end face 248*a* of the core member 248 and the outer peripheral surface of the rotary magnetic cylinder member 9 become in parallel.

The display content of the indicator M in this case is varied as shown by the curve fo in FIG. 22 with the variation of the minimum distance g1 (magnetic air gap length) between the top end face 248*a* of the core member 248 and the outer peripheral surface of the rotary magnetic cylinder member 9.

According to the indicated content of the indicator M, the rotation regulating member 261 protruding from the head block mounting member 210 is rotated such that the series resonance frequency of the series resonance circuit composed of the exciting coil 228 and the resonance capacitor Co becomes 82.3 KHz, the screws 238 and 239 are inserted into the screw holes 246 and 247 formed in the side wall of the magnetic head holder 281 shown in FIG. 21 and then the cone member 248 of the bias magnetic field generating head is fixed to the magnetic head holder 281 by tightening these screws by means of the notation regulating member 277 protruding from the block mounting member 210.

When the head block mounting member 210 which is substantially separated from the position of the rotary magnetic cylinder member 9 is moved toward the outer peripheral surface of the cylinder member 9 by means of the moving mechanism such as slide base until the top end face 248*a* of the cope member 248 reaches a position remote from the outer peripheral surface of the rotary magnetic cylinder member 9 by 150 μm, the capture frequency of the phase locked loop is fixed to a narrow range such as, for example, the center frequency 5 KHz. In detail, when the head block mounting member 210 is moved toward the outer peripheral surface of the rotary magnetic cylinder member 9 and the top end face 48*a* of the core member 248 arrives at a position remote from the drum surface by 190 μm, the phase locked loop becomes in a lock-in state.

When the phase locked loop is in the lock-in state, it provides at the output terminal 269*d* of the phase comparator circuit 269 thereof a logic output 1 indicating that the phase locked loop is synchronized. This logic output signal is supplied to the gate of the field effect transistor TR and the cathode of the diode D. Assuming that the field effect transistor TR is a junction type P channel FET as shown in FIG. 17 and the gate electrode of the field effect transistor TR is logic 0, that is, ground potential, the transistor TR is turned on due to connection of the source electrode thereof to an imaginary intermediate potential at the inverted input terminal of the operational amplifier 272 and thus tile operational amplifier 272 becomes inoperable. However, when the logic 1, that is, a positive potential (for example, +5 V) is supplied to the gate electrode of the field effect transistor TR, the latter is turned off, so that the signal supplied from the output terminal 271b of the low-pass filter 271 through the resistor R206 to the inverted input terminal of the operational amplifier 272 is amplified by the latter and supplied through the resistor R208 to the indicator H, providing an indication.

The low-pass filter 271 removes a secondary high harmonic wave component of the positive analog error signal supplied from the output terminal 269c of the phase comparator circuit 269 to the input terminal 271c thereof and outputs a frequency discrimination output signal. Further, since the offset regulation voltage set by the slider of the variable resistor VR connected between the ground potential and the reference source voltage +Vs is supplied to the non-inverted input terminal of the operational amplifier 272, the latter amplifies can amplify only the frequency discrimination output signal from the low-pass filter 271 with the positive offset voltage thereof being removed and supply it to the indicator M.

The voltage comparators 273 and 274 to which the output signal of the operational amplifier 272 is supplied constitute a monitor circuit for determining whether or not the output signal of the operational amplifier 272 is within a predetermined voltage range whose output signal is sent through the logic buffer 275 and the output terminal 265 as a monitor data. The monitor data may be supplied to a central operation processing device provided in the transfer apparatus for controlling the operation of the bias magnetic field generator and used to output an alarm signal when the output signal of the operational amplifier 272 becomes out of the predetermined voltage range to allow an operator to re-regulate the rotation regulating member 261 protruding externally from the head block mounting member 210.

As described in detail hereinbefore, the bias magnetic field generator for use in a magnetic recording medium copying machine has a bias magnetic field generating magnetic head constituted with a core member fixed to a magnetic head holder and having a curved face, a core member including a main magnetic pole for generating a bias magnetic field and movably supported by the magnetic head holder as a movable core member, the movable core member being provided separately from and magnetically coupled to the core member, the movable core member being capable of changing a tilt angle of a cross line between a specific one of planes including a center line of a rotary magnetic cylinder member and a top end face of the main magnetic pole with respect to the center line of the rotary magnetic cylinder member within a predetermined angular range, and an exciting coil wound on a coil bobbin and, when a bias magnetic field generated between the main magnetic pole and an outer peripheral surface of the rotary magnetic cylinder member at least an outer peripheral portion of which is made of high permeability material by supplying exciting current to the exciting coil is applied to a master recording medium and a slave recording medium having a magnetic surface in intimate contact with a magnetic surface of the master recording medium run with rotation of the rotary magnetic cylinder member while being made in pressure-contact, the movable core member can be easily regulated by a shift regulation mechanism constructed such that top ends of screws having fine pitch are thread-engaged with portions thereof corresponding to two separate portions in a direction corresponding to an extension of the center axis of the rotary magnetic cylinder member on an opposite side to an end portion in which the top end portion of the main magnetic pole is provided, in such a way that the top end face of the main magnetic pole becomes parallel to the outer peripheral surface of the rotary magnetic cylinder member. Further, in relation to the parallelism between the face of the main magnetic pole and the outer peripheral surface of the rotary magnetic cylinder member, it is easily possible to regulate the top end face of the main magnetic pole such that it becomes exactly in parallel to the surface of the rotary magnetic cylinder member by regulating the shift regulation mechanism while monitoring a content of display on the indicator indicating an output of a detection device (for example, a phase locked loop) for detecting frequency of exciting current supplied to the exciting coil. Further, it is possible to determine whether or not the output of the frequency variation detection device is within a predetermined range and to regulate the magnetic recording information transfer apparatus according to the determination such that the latter always operate in a good condition. Further, the problems of the conventional bias magnetic field generator, that is, the high precision machining and assembling operations for the magnetic head and the slide base mechanism for moving a pressure contact portion including the magnetic head, required in the magnetic head having a single magnetic pole for generating a magnetic field including effective vertical field component as a major portion, and difficulty of maintaining a normal tilting state of the head due to small dynamic change of exhausting path for compressed air caused by variation of thickness of the magnetic recording media, etc., in intimately contacting them to the outer peripheral surface of the rotary magnetic cylinder member by means of compressed air even if the bias magnetic field generator is assembled with required precision, are solved since, in the present invention, it is easy to obtain a stable magnetic field distribution characteristics by means of simple tilt regulation, without necessity of complicated magnetized pattern developing process after information transfer. Thus, the bias magnetic field generator of the present invention is easy in maintenance and can generate a magnetic field which is uniform in the width direction of the magnetic recording medium. Further, the single pole vertical head core of the bias magnetic field generating head used in the bias magnetic field generator of the present invention is simple in structure and easy in manufacture and further there is no need of head angle detection using such as leakage flux detecting coil, etc., and only a single set of exciting coil and exciting current supply circuit, etc., is required.

What is claimed is:

1. A magnetic field generating apparatus for generating a biasing magnetic field applied to a master tape and a slave tape which are contacted each other when magnetic information signals recorded on the master tape are transferred to the slave tape, the apparatus comprising:

a rotary cylinder of which a surface is at least made of a magnetic material having a high magnetic permeability;

main magnetic pole means of which a front thereof is disposed to confront the rotary cylinder through a gap defined by a first predetermined distance for projecting the biasing magnetic field toward the rotary cylinder therethrough where said master and slave tapes are interposed between tile rotary cylinder and the main magnetic pole means at said gap;

depressing means for depressing by blowing air the master tape and the slave tape together to the rotary cylinder nearby the gap;

an exciting source for exciting tile main magnetic pole means to generate the biasing magnetic field;

sub-magnetic pole means for passing magnetic flux comprising at least one side-core disposed at one side of the main magnetic pole means, said side-core having a front and rear portions, said front portion extending closely along and closely confronting the rotary cylinder from outside thereof and opposing the front of the main magnetic pole means at a second predetermined distance, said rear portion being connected to a rear of the main magnetic pole means, wherein the second predetermined distance is substantially larger than the first predetermined distance, and a confronting area of the front portion is substantially larger than a confronting area of the main magnetic pole means facing to the rotary cylinder; and said main magnetic pole means further comprising a core body having a front face extending approximately parallel to a rotation axis of the rotary cylinder and confronting a surface thereof, said magnetic field generating apparatus further comprising tilting means for causing the front face to tilt within a plane including the rotation axis of the rotary cylinder so that an angle of the front face with respect to the surface of the rotary cylinder is changed.

2. A magnetic field generating apparatus for generating a biasing magnetic field applied to a master tape and a slave tape which are contacted each other when magnetic information signals recorded on the master tape are transferred to the slave tape, the apparatus comprising:

a rotary cylinder of which a surface is at least made of a magnetic material having a high magnetic permeability;

main magnetic pole means of which a front thereof is disposed to confront the rotary cylinder through a gap defined by a first predetermined distance for projecting the biasing magnetic field toward the rotary cylinder therethrough where said master and slave tapes are interposed between the rotary cylinder and the main magnetic pole means at said gap;

depressing means for depressing by blowing air the master tape and the slave tape together to the rotary cylinder nearby the gap;

an exciting source for exciting the main magnetic pole means to generate the biasing magnetic field;

sub-magnetic pole means for passing magnetic flux comprising at least one side-core disposed at one side of the main magnetic pole means, said side-core having a front and rear portions, said front portion extending closely along and closely confronting the rotary cylinder from outside thereof and opposing the front of the main magnetic pole means at a second predetermined distance, said rear portion being connected to a rear of the main magnetic pole means, wherein the second predetermined distance is substantially larger than the first predetermined distance, and a confronting area of the front portion is substantially larger than a confronting area of the main magnetic pole means facing to the rotary cylinder, and said magnetic field generating apparatus further comprising an automatic exciting current control means and flux detecting means provided on the main magnetic pole means for detecting magnetic flux in the main magnetic pole means, the automatic exciting current control means controlling an exciting current of the main magnetic pole means to a predetermined value in response to an output of the flux detecting means.

3. A magnetic field generating apparatus for generating a biasing magnetic field applied to a master tape and a slave tape which are contacted each other when magnetic information signals recorded on the master tape are transferred to the slave tape, the apparatus comprising:

a rotary cylinder of which a surface is at least made of a magnetic material having a high magnetic permeability;

main magnetic pole means of which a front thereof is disposed to confront the rotary cylinder through a gap defined by a first predetermined distance for projecting the biasing magnetic field toward the rotary cylinder therethrough where said master and slave tapes are interposed between the rotary cylinder and the main magnetic pole means at said gap;

depressing means for depressing by blowing air the master tape and the slave tape together to the rotary cylinder nearby the gap;

an exciting source for exciting the main magnetic pole means to generate the biasing magnetic field;

sub-magnetic pole means for passing magnetic flux comprising at least one side-core disposed at one side of the main magnetic pole means, said side-core having a front and rear portions, said front portion extending closely along and closely confronting the rotary cylinder from outside thereof and opposing the front of the main magnetic pole means at a second predetermined distance, said rear portion being connected to a rear of the main magnetic pole means, wherein the second predetermined distance is substantially larger than the first predetermined distance, and a confronting area of the front portion is substantially larger than a confronting area of the main magnetic pole means facing to the rotary cylinder, said main magnetic pole means further comprising a core body having a front face extending approximately parallel to a rotation axis of the rotary cylinder and confronting a surface thereof, said magnetic field generating apparatus further comprising tilting means for causing the front face to tilt within a plane including the rotation axis of the rotary cylinder so that an angle of the front face with respect to the surface of the rotary cylinder is changed; and said core body of the main magnetic pole means being wound with an exciting coil having an inductance, said exciting source including an oscillating circuit having an oscillating frequency which depends on the inductance of the exciting coil, and wherein said magnetic field generating apparatus further comprises frequency detecting means for detecting the oscillating frequency, and display means for displaying an output of the frequency detecting means, the inductance of the exciting coil changes when the front face of the core body is tilted by the tilting means causing a change in the oscillating frequency so that the angle of the front .face with respect to the surface of the rotary cylinder can be adjusted by monitoring the display means.

* * * * *